US010997872B2

(12) United States Patent  
Caponi et al.

(10) Patent No.: US 10,997,872 B2  
(45) Date of Patent: May 4, 2021

(54) SPRING-LOADED TIP ASSEMBLY TO SUPPORT SIMULATED SHIELDED METAL ARC WELDING

(71) Applicant: Lincoln Global, Inc., Santa Fe Springs, CA (US)

(72) Inventors: Darren P. Caponi, North Ridgeville, OH (US); Andrew S. Koshar, Willoughby, OH (US); Bruce John Chantry, Solon, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 522 days.

(21) Appl. No.: 15/696,495

(22) Filed: Sep. 6, 2017

(65) Prior Publication Data

US 2018/0350270 A1 Dec. 6, 2018

Related U.S. Application Data

(60) Provisional application No. 62/531,584, filed on Jun. 1, 2017.

(51) Int. Cl.
  *G09B 25/02* (2006.01)
  *G09B 19/24* (2006.01)
  (Continued)

(52) U.S. Cl.
  CPC .............. *G09B 25/02* (2013.01); *B23K 9/173* (2013.01); *B23K 9/26* (2013.01); *B23K 9/291* (2013.01);
  (Continued)

(58) Field of Classification Search
  CPC ...... G09B 25/02; G09B 19/003; G09B 19/24; G09B 23/285; B23K 9/26; B23K 9/32; B23K 9/173; B23K 9/291; A61M 25/0618
  (Continued)

(56) References Cited

U.S. PATENT DOCUMENTS 317,063 A  5/1885 Wittenstrom
428,459 A  5/1890 Coffin
(Continued)

FOREIGN PATENT DOCUMENTS

CA  2698078 A1  9/2011
CN  101209512 A  7/2008
(Continued)

OTHER PUBLICATIONS

Physical Principles of Ultrasonic Technology, L.D. Rozenberg, ed. vol. 1, p. 109 (Year: 1973).*

(Continued)

*Primary Examiner* — James B Hull
*Assistant Examiner* — Jennifer L Korb
(74) *Attorney, Agent, or Firm* — David J. Muzilla

(57) ABSTRACT

Embodiments of systems, apparatus, and methods to support the simulation of a shielded metal arc welding (SMAW) operation are disclosed. One embodiment is a tip assembly that includes an elongate mock electrode tip having a proximal end, a distal end, and a locking sleeve near the proximal end. A compression spring is configured to interface with the proximal end of the electrode tip. A locking cup is configured to encompass the compression spring and the locking sleeve. A housing, having an orifice, is configured to receive the electrode tip, the compression spring, and the locking cup into an interior of the housing by accepting the distal end of the electrode tip through the orifice up to the locking sleeve. The locking sleeve and the locking cup are configured to be rotated with respect to each other to allow changing between a locked position and an unlocked position.

19 Claims, 15 Drawing Sheets

(51) Int. Cl.
*G09B 19/00* (2006.01)
*B23K 9/32* (2006.01)
*B23K 9/26* (2006.01)
*B23K 9/173* (2006.01)
*B23K 9/29* (2006.01)

(52) U.S. Cl.
CPC .............. *B23K 9/32* (2013.01); *G09B 19/003* (2013.01); *G09B 19/24* (2013.01)

(58) Field of Classification Search
USPC ........................................................ 434/234
See application file for complete search history.

(56) References Cited

U.S. PATENT DOCUMENTS

| | | | |
|---|---|---|---|
| 483,428 | A | 9/1892 | Coffin |
| 1,159,119 | A | 11/1915 | Springer |
| 1,286,529 | A | 12/1918 | Cave |
| 2,333,192 | A * | 11/1943 | Moberg ................ B23K 9/32 434/234 |
| D140,630 | S | 3/1945 | Garibay |
| D142,377 | S | 9/1945 | Dunn |
| D152,049 | S | 12/1948 | Welch, Jr. |
| 2,681,969 | A | 6/1954 | Burke |
| D174,208 | S | 3/1955 | Abildgaard |
| 2,728,838 | A | 12/1955 | Barnes |
| D176,942 | S | 2/1956 | Cross |
| 2,894,086 | A | 7/1959 | Rizer |
| 3,035,155 | A | 5/1962 | Hawk |
| 3,059,519 | A | 10/1962 | Stanton |
| 3,356,823 | A | 12/1967 | Waters et al. |
| 3,555,239 | A | 1/1971 | Kerth |
| 3,621,177 | A | 11/1971 | McPherson et al. |
| 3,654,421 | A | 4/1972 | Streetman et al. |
| 3,739,140 | A | 6/1973 | Rotilio |
| 3,866,011 | A | 2/1975 | Cole |
| 3,867,769 | A | 2/1975 | Schow et al. |
| 3,904,845 | A | 9/1975 | Minkiewicz |
| 3,988,913 | A | 11/1976 | Metcalfe et al. |
| D243,459 | S | 2/1977 | Bliss |
| 4,024,371 | A | 5/1977 | Drake |
| 4,041,615 | A | 8/1977 | Whitehill |
| D247,421 | S | 3/1978 | Driscoll |
| 4,124,944 | A | 11/1978 | Blair |
| 4,132,014 | A | 1/1979 | Schow |
| 4,237,365 | A | 12/1980 | Lambros et al. |
| 4,280,041 | A | 7/1981 | Kiessling et al. |
| 4,280,042 | A | 7/1981 | Berger et al. |
| 4,280,137 | A | 7/1981 | Ashida et al. |
| 4,314,125 | A | 2/1982 | Nakamura |
| 4,354,087 | A | 10/1982 | Osterlitz |
| 4,359,622 | A | 11/1982 | Dostoomian et al. |
| 4,375,026 | A | 2/1983 | Kearney |
| 4,410,787 | A | 10/1983 | Kremers et al. |
| 4,429,266 | A | 1/1984 | Tradt |
| 4,452,589 | A | 6/1984 | Denison |
| D275,292 | S | 8/1984 | Bouman |
| D277,761 | S | 2/1985 | Korovin et al. |
| 4,525,619 | A | 6/1985 | Ide et al. |
| D280,329 | S | 8/1985 | Bouman |
| 4,611,111 | A | 9/1986 | Baheti et al. |
| 4,616,326 | A | 10/1986 | Meier et al. |
| 4,629,860 | A | 12/1986 | Lindbom |
| 4,677,277 | A | 6/1987 | Cook et al. |
| 4,680,014 | A | 7/1987 | Paton et al. |
| 4,689,021 | A | 8/1987 | Vasiliev et al. |
| 4,707,582 | A | 11/1987 | Beyer |
| 4,716,273 | A | 12/1987 | Paton et al. |
| D297,704 | S | 9/1988 | Bulow |
| 4,867,685 | A | 9/1989 | Brush et al. |
| 4,877,940 | A | 10/1989 | Bangs et al. |
| 4,897,521 | A | 1/1990 | Burr |
| 4,907,973 | A | 3/1990 | Hon |
| 4,931,018 | A | 6/1990 | Herbst et al. |
| 4,973,814 | A | 11/1990 | Kojima et al. |
| 4,998,050 | A | 3/1991 | Nishiyama et al. |
| 5,034,593 | A | 7/1991 | Rice et al. |
| 5,061,841 | A | 10/1991 | Richardson |
| 5,089,914 | A | 2/1992 | Prescott |
| 5,192,845 | A | 3/1993 | Kirmsse et al. |
| 5,206,472 | A | 4/1993 | Myking et al. |
| 5,266,930 | A | 11/1993 | Ichikawa et al. |
| 5,285,916 | A | 2/1994 | Ross |
| 5,305,183 | A | 4/1994 | Teynor |
| 5,320,538 | A | 6/1994 | Baum |
| 5,337,611 | A | 8/1994 | Fleming et al. |
| 5,360,156 | A | 11/1994 | Ishizaka et al. |
| 5,360,960 | A | 11/1994 | Shirk |
| 5,370,071 | A | 12/1994 | Ackermann |
| D359,296 | S | 6/1995 | Witherspoon |
| 5,424,634 | A | 6/1995 | Goldfarb et al. |
| 5,436,638 | A | 7/1995 | Bolas et al. |
| 5,464,957 | A | 11/1995 | Kidwell et al. |
| D365,583 | S | 12/1995 | Viken |
| 5,562,843 | A | 10/1996 | Yasumoto |
| 5,662,822 | A | 9/1997 | Tada |
| 5,670,071 | A | 9/1997 | Ueyama et al. |
| 5,673,450 | A * | 10/1997 | Briscoe .................. A47L 11/14 15/49.1 |
| 5,676,503 | A | 10/1997 | Lang |
| 5,676,867 | A | 10/1997 | Van Allen |
| 5,708,253 | A | 1/1998 | Bloch et al. |
| 5,710,405 | A | 1/1998 | Solomon et al. |
| 5,719,369 | A | 2/1998 | White et al. |
| D392,534 | S | 3/1998 | Degen et al. |
| 5,728,991 | A | 3/1998 | Takada et al. |
| 5,751,258 | A | 5/1998 | Fergason et al. |
| D395,296 | S | 6/1998 | Kaye et al. |
| D396,238 | S | 7/1998 | Schmitt |
| 5,781,258 | A | 7/1998 | Dabral et al. |
| 5,823,785 | A | 10/1998 | Matherne, Jr. |
| 5,835,077 | A | 11/1998 | Dao et al. |
| 5,835,277 | A | 11/1998 | Hegg |
| 5,845,053 | A | 12/1998 | Watanabe et al. |
| 5,877,777 | A | 3/1999 | Colwell |
| 5,916,464 | A | 6/1999 | Geiger |
| 5,963,891 | A | 10/1999 | Walker et al. |
| 6,008,470 | A | 12/1999 | Zhang et al. |
| 6,037,948 | A | 3/2000 | Liepa |
| 6,049,059 | A | 4/2000 | Kim |
| 6,051,805 | A | 4/2000 | Vaidya et al. |
| 6,114,645 | A | 9/2000 | Burgess |
| 6,155,475 | A | 12/2000 | Ekelof et al. |
| 6,155,928 | A | 12/2000 | Burdick |
| 6,230,327 | B1 | 5/2001 | Briand et al. |
| 6,236,013 | B1 | 5/2001 | Delzenne |
| 6,236,017 | B1 | 5/2001 | Smartt et al. |
| 6,242,711 | B1 | 6/2001 | Cooper |
| 6,271,500 | B1 | 8/2001 | Hirayama et al. |
| 6,330,938 | B1 | 12/2001 | Herve et al. |
| 6,330,966 | B1 | 12/2001 | Eissfeller |
| 6,331,848 | B1 | 12/2001 | Stove et al. |
| D456,428 | S | 4/2002 | Aronson, II et al. |
| 6,373,465 | B2 | 4/2002 | Jolly et al. |
| D456,828 | S | 5/2002 | Aronson, II et al. |
| D461,383 | S | 8/2002 | Blackburn |
| 6,441,342 | B1 | 8/2002 | Hsu |
| 6,445,964 | B1 | 9/2002 | White et al. |
| 6,492,618 | B1 | 12/2002 | Flood et al. |
| 6,506,997 | B2 | 1/2003 | Matsuyama |
| 6,552,303 | B1 | 4/2003 | Blankenship et al. |
| 6,560,029 | B1 | 5/2003 | Dobbie et al. |
| 6,563,489 | B1 | 5/2003 | Latypov et al. |
| 6,568,846 | B1 | 5/2003 | Cote et al. |
| D475,726 | S | 6/2003 | Suga et al. |
| 6,572,379 | B1 | 6/2003 | Sears et al. |
| 6,583,386 | B1 | 6/2003 | Ivkovich |
| 6,602,953 | B1 * | 8/2003 | Horio ..................... C08L 59/02 525/100 |
| 6,621,049 | B2 | 9/2003 | Suzuki |
| 6,624,388 | B1 | 9/2003 | Blankenship et al. |
| D482,171 | S | 11/2003 | Vui et al. |
| 6,647,288 | B2 | 11/2003 | Madill et al. |

(56) References Cited

U.S. PATENT DOCUMENTS

| | | |
|---|---|---|
| 6,649,858 B2 | 11/2003 | Wakeman |
| 6,655,645 B1 | 12/2003 | Lu et al. |
| 6,660,965 B2 | 12/2003 | Simpson |
| 6,697,701 B2 | 2/2004 | Hillen et al. |
| 6,697,770 B1 | 2/2004 | Nagetgaal |
| 6,703,585 B2 | 3/2004 | Suzuki |
| 6,708,385 B1 | 3/2004 | Lemelson |
| 6,710,298 B1 | 3/2004 | Eriksson |
| 6,710,299 B2 | 3/2004 | Blankenship et al. |
| 6,715,502 B1 | 4/2004 | Rome et al. |
| D490,347 S | 5/2004 | Meyers |
| 6,730,875 B2 | 5/2004 | Hsu |
| 6,734,393 B1 | 5/2004 | Friedl et al. |
| 6,744,011 B1 | 6/2004 | Hu et al. |
| 6,750,428 B2 | 6/2004 | Okamoto et al. |
| 6,765,584 B1 | 7/2004 | Wloka et al. |
| 6,768,974 B1 | 7/2004 | Nanjundan et al. |
| 6,772,802 B2 | 8/2004 | Few |
| 6,788,442 B1 | 9/2004 | Potin et al. |
| 6,795,778 B2 | 9/2004 | Dodge et al. |
| 6,798,974 B1 | 9/2004 | Nakano et al. |
| 6,857,553 B1 | 2/2005 | Hartman et al. |
| 6,858,817 B2 | 2/2005 | Blankenship et al. |
| 6,865,926 B2 | 3/2005 | O'Brien et al. |
| D504,449 S | 4/2005 | Butchko |
| 6,920,371 B2 | 7/2005 | Hillen et al. |
| 6,940,037 B1 | 9/2005 | Kovacevic et al. |
| 6,940,039 B2 | 9/2005 | Blankenship et al. |
| 7,021,937 B2 | 4/2006 | Simpson et al. |
| 7,024,342 B1 | 4/2006 | Waite et al. |
| 7,082,870 B2 * | 8/2006 | Verbo .................. B60T 13/567 91/376 R |
| 7,126,078 B2 | 10/2006 | Demers et al. |
| 7,132,617 B2 | 11/2006 | Lee et al. |
| 7,170,032 B2 | 1/2007 | Flood |
| 7,194,447 B2 | 3/2007 | Harvey et al. |
| 7,247,814 B2 | 7/2007 | Ott |
| D555,446 S | 11/2007 | Picaza Ibarrondo et al. |
| 7,315,241 B1 | 1/2008 | Daily et al. |
| D561,973 S | 2/2008 | Kinsley et al. |
| 7,353,715 B2 | 4/2008 | Myers |
| 7,363,137 B2 | 4/2008 | Brant et al. |
| 7,375,304 B2 | 5/2008 | Kainec et al. |
| 7,381,923 B2 | 6/2008 | Gordon et al. |
| 7,414,595 B1 | 8/2008 | Muffler |
| 7,465,230 B2 | 12/2008 | LeMay et al. |
| 7,478,108 B2 | 1/2009 | Townsend et al. |
| D587,975 S | 3/2009 | Aronson, II et al. |
| 7,516,022 B2 | 4/2009 | Lee et al. |
| 7,557,327 B2 | 7/2009 | Matthews |
| 7,580,821 B2 | 8/2009 | Schirm et al. |
| D602,057 S | 10/2009 | Osicki |
| 7,621,171 B2 | 11/2009 | O'Brien |
| D606,102 S | 12/2009 | Bender et al. |
| 7,643,890 B1 | 1/2010 | Hillen et al. |
| 7,687,741 B2 | 3/2010 | Kainec et al. |
| D614,217 S | 4/2010 | Peters et al. |
| D615,573 S | 5/2010 | Peters et al. |
| 7,817,162 B2 | 10/2010 | Bolick et al. |
| 7,853,645 B2 | 12/2010 | Brown et al. |
| D631,074 S | 1/2011 | Peters et al. |
| 7,874,921 B2 | 1/2011 | Baszucki et al. |
| 7,970,172 B1 | 6/2011 | Hendrickson |
| 7,972,129 B2 | 7/2011 | O'Donoghue |
| 7,991,587 B2 | 8/2011 | Ihn |
| 8,069,017 B2 | 11/2011 | Hallquist |
| 8,224,881 B1 | 7/2012 | Spear et al. |
| 8,248,324 B2 | 8/2012 | Nangle |
| 8,265,886 B2 | 9/2012 | Bisiaux et al. |
| 8,274,013 B2 | 9/2012 | Wallace |
| 8,287,522 B2 | 10/2012 | Moses et al. |
| 8,316,462 B2 | 11/2012 | Becker et al. |
| 8,363,048 B2 | 1/2013 | Gering |
| 8,365,603 B2 | 2/2013 | Lesage et al. |
| 8,512,043 B2 | 8/2013 | Choquet |
| 8,569,646 B2 | 10/2013 | Daniel et al. |
| 8,680,434 B2 | 3/2014 | Stoger et al. |
| 8,747,116 B2 * | 6/2014 | Zboray .................. G09B 19/24 219/130.21 |
| 8,777,629 B2 | 7/2014 | Kreindl et al. |
| RE45,062 E | 8/2014 | Maguire, Jr. |
| 8,851,896 B2 | 10/2014 | Wallace |
| 8,860,760 B2 | 10/2014 | Chen |
| 8,915,740 B2 | 12/2014 | Zboray |
| RE45,398 E | 3/2015 | Wallace |
| 8,992,226 B1 | 3/2015 | Leach et al. |
| 9,011,154 B2 | 4/2015 | Kindig |
| 9,293,056 B2 | 3/2016 | Zboray et al. |
| 9,293,057 B2 | 3/2016 | Zboray et al. |
| 9,318,026 B2 | 4/2016 | Peters |
| 9,323,056 B2 | 4/2016 | Williams |
| 9,522,437 B2 | 12/2016 | Pfeifer |
| 2001/0045808 A1 | 11/2001 | Hietmann et al. |
| 2001/0052893 A1 | 12/2001 | Jolly et al. |
| 2002/0032553 A1 | 3/2002 | Simpson et al. |
| 2002/0046999 A1 | 4/2002 | Veikkolainen et al. |
| 2002/0050984 A1 | 5/2002 | Roberts |
| 2002/0085843 A1 | 7/2002 | Mann |
| 2002/0175897 A1 | 11/2002 | Pelosi |
| 2003/0000931 A1 | 1/2003 | Ueda et al. |
| 2003/0025884 A1 | 2/2003 | Hamana et al. |
| 2003/0075534 A1 | 4/2003 | Okamoto et al. |
| 2003/0106787 A1 | 6/2003 | Santilli |
| 2003/0111451 A1 | 6/2003 | Blankenship et al. |
| 2003/0172032 A1 | 9/2003 | Choquet |
| 2003/0186199 A1 | 10/2003 | McCool et al. |
| 2003/0223592 A1 | 12/2003 | Deruginsky et al. |
| 2003/0234885 A1 | 12/2003 | Pilu |
| 2004/0020907 A1 | 2/2004 | Zauner et al. |
| 2004/0035990 A1 | 2/2004 | Ackeret |
| 2004/0050824 A1 | 3/2004 | Samler |
| 2004/0088071 A1 | 5/2004 | Kouno et al. |
| 2004/0140301 A1 | 7/2004 | Blankenship et al. |
| 2004/0181382 A1 | 9/2004 | Hu et al. |
| 2004/0217096 A1 | 11/2004 | Lipnevicius |
| 2005/0007504 A1 | 1/2005 | Fergason |
| 2005/0017152 A1 | 1/2005 | Fergason |
| 2005/0029326 A1 | 2/2005 | Henrickson |
| 2005/0046584 A1 | 3/2005 | Breed |
| 2005/0050168 A1 | 3/2005 | Wen et al. |
| 2005/0101767 A1 | 5/2005 | Clapham et al. |
| 2005/0103766 A1 | 5/2005 | Iizuka et al. |
| 2005/0103767 A1 | 5/2005 | Kainec et al. |
| 2005/0109735 A1 | 5/2005 | Flood |
| 2005/0128186 A1 | 6/2005 | Shahoian et al. |
| 2005/0133488 A1 | 6/2005 | Blankenship et al. |
| 2005/0159840 A1 | 7/2005 | Lin et al. |
| 2005/0163364 A1 | 7/2005 | Beck et al. |
| 2005/0189336 A1 | 9/2005 | Ku |
| 2005/0199602 A1 | 9/2005 | Kaddani et al. |
| 2005/0230573 A1 | 10/2005 | Ligertwood |
| 2005/0252897 A1 | 11/2005 | Hsu et al. |
| 2005/0275913 A1 | 12/2005 | Vesely et al. |
| 2005/0275914 A1 | 12/2005 | Vesely et al. |
| 2006/0014130 A1 | 1/2006 | Weinstein |
| 2006/0076321 A1 | 4/2006 | Maev et al. |
| 2006/0136183 A1 | 6/2006 | Choquet |
| 2006/0142656 A1 | 6/2006 | Malackowski et al. |
| 2006/0154226 A1 | 7/2006 | Maxfield |
| 2006/0163227 A1 | 7/2006 | Hillen et al. |
| 2006/0166174 A1 | 7/2006 | Rowe et al. |
| 2006/0169682 A1 | 8/2006 | Kainec et al. |
| 2006/0173619 A1 | 8/2006 | Brant et al. |
| 2006/0189260 A1 | 8/2006 | Sung |
| 2006/0207980 A1 | 9/2006 | Jacovetty et al. |
| 2006/0213892 A1 | 9/2006 | Ott |
| 2006/0214924 A1 | 9/2006 | Kawamoto et al. |
| 2006/0226137 A1 | 10/2006 | Huismann et al. |
| 2006/0252543 A1 | 11/2006 | Van Noland et al. |
| 2006/0258447 A1 | 11/2006 | Baszucki et al. |
| 2007/0034611 A1 | 2/2007 | Drius et al. |
| 2007/0038400 A1 | 2/2007 | Lee et al. |
| 2007/0045488 A1 | 3/2007 | Shin |
| 2007/0088536 A1 | 4/2007 | Ishikawa |

(56) References Cited

U.S. PATENT DOCUMENTS

| | | |
|---|---|---|
| 2007/0112889 A1 | 5/2007 | Cook et al. |
| 2007/0198117 A1 | 8/2007 | Wajihuddin |
| 2007/0209586 A1 | 9/2007 | Ebensberger et al. |
| 2007/0211026 A1 | 9/2007 | Ohta |
| 2007/0221797 A1 | 9/2007 | Thompson et al. |
| 2007/0256503 A1 | 11/2007 | Wong et al. |
| 2007/0277611 A1 | 12/2007 | Portzgen et al. |
| 2007/0291035 A1 | 12/2007 | Vesely et al. |
| 2008/0021311 A1 | 1/2008 | Goldbach |
| 2008/0031774 A1 | 2/2008 | Magnant et al. |
| 2008/0038702 A1 | 2/2008 | Choquet |
| 2008/0061113 A9 | 3/2008 | Seki et al. |
| 2008/0078811 A1 | 4/2008 | Hillen et al. |
| 2008/0078812 A1 | 4/2008 | Peters et al. |
| 2008/0117203 A1 | 5/2008 | Gering |
| 2008/0120075 A1 | 5/2008 | Wloka |
| 2008/0128398 A1 | 6/2008 | Schneider |
| 2008/0135533 A1 | 6/2008 | Ertmer et al. |
| 2008/0140815 A1 | 6/2008 | Brant et al. |
| 2008/0149686 A1 | 6/2008 | Daniel et al. |
| 2008/0203075 A1 | 8/2008 | Feldhausen et al. |
| 2008/0233550 A1 | 9/2008 | Solomon |
| 2008/0303197 A1 | 12/2008 | Paquette et al. |
| 2008/0314887 A1 | 12/2008 | Stoger et al. |
| 2009/0015585 A1 | 1/2009 | Klusza |
| 2009/0021514 A1 | 1/2009 | Klusza |
| 2009/0045183 A1 | 2/2009 | Artelsmair et al. |
| 2009/0050612 A1 | 2/2009 | Serruys |
| 2009/0057286 A1 | 3/2009 | Ihara et al. |
| 2009/0152251 A1 | 6/2009 | Dantinne et al. |
| 2009/0173726 A1 | 7/2009 | Davidson et al. |
| 2009/0184098 A1 | 7/2009 | Daniel et al. |
| 2009/0200281 A1 | 8/2009 | Hampton |
| 2009/0200282 A1 | 8/2009 | Hampton |
| 2009/0231423 A1 | 9/2009 | Becker et al. |
| 2009/0259444 A1 | 10/2009 | Dolansky et al. |
| 2009/0298024 A1 | 12/2009 | Batzler et al. |
| 2009/0325699 A1 | 12/2009 | Delgiannidis |
| 2010/0012017 A1 | 1/2010 | Miller |
| 2010/0012637 A1 | 1/2010 | Jaeger |
| 2010/0048273 A1 | 2/2010 | Wallace et al. |
| 2010/0062405 A1 | 3/2010 | Zboray et al. |
| 2010/0062406 A1 | 3/2010 | Zboray |
| 2010/0096373 A1 | 4/2010 | Hillen et al. |
| 2010/0121472 A1 | 5/2010 | Babu et al. |
| 2010/0133247 A1 | 6/2010 | Mazumder et al. |
| 2010/0133250 A1 | 6/2010 | Sardy et al. |
| 2010/0176107 A1 | 7/2010 | Bong |
| 2010/0201803 A1 | 8/2010 | Melikian |
| 2010/0224610 A1 | 9/2010 | Wallace |
| 2010/0276396 A1 | 11/2010 | Cooper et al. |
| 2010/0299101 A1 | 11/2010 | Shimada et al. |
| 2010/0307249 A1 | 12/2010 | Lesage et al. |
| 2011/0006047 A1 | 1/2011 | Penrod et al. |
| 2011/0060568 A1 | 3/2011 | Goldline et al. |
| 2011/0091846 A1 | 4/2011 | Kreindl et al. |
| 2011/0114615 A1 | 5/2011 | Daniel et al. |
| 2011/0116076 A1 | 5/2011 | Chantry et al. |
| 2011/0117527 A1 | 5/2011 | Conrardy et al. |
| 2011/0122495 A1 | 5/2011 | Togashi |
| 2011/0169205 A1* | 7/2011 | Kempf .................. B29C 45/44 267/180 |
| 2011/0183304 A1 | 7/2011 | Wallace et al. |
| 2011/0187746 A1 | 8/2011 | Suto et al. |
| 2011/0248864 A1 | 10/2011 | Becker et al. |
| 2011/0290765 A1 | 12/2011 | Albrecht et al. |
| 2011/0316516 A1 | 12/2011 | Schiefermuller et al. |
| 2012/0122062 A1 | 5/2012 | Yang et al. |
| 2012/0189993 A1 | 7/2012 | Kindig et al. |
| 2012/0291172 A1 | 11/2012 | Wills et al. |
| 2012/0298640 A1 | 11/2012 | Conrardy et al. |
| 2013/0026150 A1 | 1/2013 | Chantry et al. |
| 2013/0040270 A1 | 2/2013 | Albrecht |
| 2013/0049976 A1 | 2/2013 | Maggiore |
| 2013/0075380 A1 | 3/2013 | Albrech et al. |
| 2013/0182070 A1 | 7/2013 | Peters et al. |
| 2013/0183645 A1 | 7/2013 | Wallace et al. |
| 2013/0189657 A1 | 7/2013 | Wallace et al. |
| 2013/0189658 A1 | 7/2013 | Peters et al. |
| 2013/0209976 A1 | 8/2013 | Postlethwaite et al. |
| 2013/0230832 A1 | 9/2013 | Peters et al. |
| 2013/0231980 A1 | 9/2013 | Elgart et al. |
| 2013/0327747 A1 | 12/2013 | Dantinne et al. |
| 2014/0017642 A1 | 1/2014 | Postlethwaite |
| 2014/0038143 A1 | 2/2014 | Daniel et al. |
| 2014/0065584 A1 | 3/2014 | Wallace et al. |
| 2014/0134579 A1 | 5/2014 | Becker |
| 2014/0134580 A1 | 5/2014 | Becker |
| 2014/0253461 A1 | 9/2014 | Hicks et al. |
| 2014/0263224 A1 | 9/2014 | Becker |
| 2014/0272835 A1 | 9/2014 | Becker |
| 2014/0272836 A1 | 9/2014 | Becker |
| 2014/0272837 A1 | 9/2014 | Becker |
| 2014/0272838 A1 | 9/2014 | Becker |
| 2014/0312020 A1 | 10/2014 | Daniel |
| 2014/0315167 A1 | 10/2014 | Kreindl et al. |
| 2014/0322684 A1 | 10/2014 | Wallace |
| 2014/0346158 A1 | 11/2014 | Matthews |
| 2015/0056584 A1 | 2/2015 | Boulware et al. |
| 2015/0056585 A1 | 2/2015 | Boulware et al. |
| 2015/0056586 A1 | 2/2015 | Penrod et al. |
| 2015/0228203 A1 | 8/2015 | Kindig |
| 2015/0375323 A1 | 12/2015 | Becker |
| 2017/0046974 A1 | 2/2017 | Becker |

FOREIGN PATENT DOCUMENTS

| | | |
|---|---|---|
| CN | 101214178 A | 7/2008 |
| CN | 201083660 Y | 7/2008 |
| CN | 103871279 A | 6/2014 |
| DE | 202012013151 U1 | 2/2015 |
| EP | 0108599 A1 | 5/1984 |
| EP | 0127299 A1 | 12/1984 |
| EP | 0145891 A1 | 6/1985 |
| EP | 0319623 A1 | 6/1989 |
| EP | 1527852 A1 | 5/2005 |
| ES | 2274736 A1 | 5/2007 |
| FR | 1456780 A | 7/1966 |
| FR | 2827066 A1 | 1/2003 |
| GB | 528 529 A | 10/1940 |
| GB | 1455972 A | 11/1976 |
| GB | 1511608 A | 5/1978 |
| GB | 2254172 A | 9/1992 |
| GB | 2435838 A | 9/2007 |
| GB | 2454232 A | 5/2009 |
| JP | 07047471 | 2/1995 |
| JP | H08505091 A | 6/1996 |
| JP | 11104833 | 4/1999 |
| JP | 2000167666 A | 6/2000 |
| KR | 20090010693 | 1/2009 |
| KR | 20140030644 A | 3/2014 |
| RU | 2008108601 A | 9/2009 |
| WO | WO-9845078 A1 | 10/1998 |
| WO | WO-0112376 A1 | 2/2001 |
| WO | WO-0143910 A1 | 6/2001 |
| WO | WO-0158400 A1 | 8/2001 |
| WO | WO-2005102230 A1 | 11/2005 |
| WO | WO-2006034571 A1 | 4/2006 |
| WO | WO-2007009131 A1 | 1/2007 |
| WO | WO-2007039278 A1 | 4/2007 |
| WO | WO-2009060231 A1 | 5/2009 |
| WO | WO-2009120921 A1 | 10/2009 |
| WO | WO-2009149740 A1 | 12/2009 |
| WO | WO-2010000003 A2 | 1/2010 |
| WO | WO-2010020867 A2 | 2/2010 |
| WO | WO-2010020870 A2 | 2/2010 |
| WO | WO-2010044982 A1 | 4/2010 |
| WO | WO-2010091493 A1 | 8/2010 |
| WO | WO-2011045654 A1 | 4/2011 |
| WO | WO-2011058433 A1 | 5/2011 |
| WO | WO-2011067447 A1 | 6/2011 |
| WO | WO-2011097035 A2 | 8/2011 |
| WO | WO-2012082105 A1 | 6/2012 |
| WO | WO-2012143327 A1 | 10/2012 |

(56) References Cited

FOREIGN PATENT DOCUMENTS

| WO | WO-2013014202 A1 | 1/2013 |
|---|---|---|
| WO | WO-2013061518 A1 | 5/2013 |
| WO | WO-2013114189 A1 | 8/2013 |
| WO | WO-2013175079 A1 | 11/2013 |
| WO | WO-2014007830 A1 | 1/2014 |
| WO | WO-2014019045 A1 | 2/2014 |
| WO | WO-2014020386 A1 | 2/2014 |

OTHER PUBLICATIONS

Partial European Search Report from Corresponding Application No. 18175115.7; dated Dec. 3, 2018; pp. 1-14.
The Lincoln Electric Company, Check Point Operator's Manual, 188 pages, issue date Aug. 2015.
William Huff, Khoi Nguyen,"Computer Vision Based Registration Techniques for Augmented Reality", Colorado School of Mines, Division of Engineering, Proceedings of Intellectual Robots and Computer Vision XV, pp. 538-548; SPIE vol. 2904, Nov. 18-22, 1996, Boston MA.
European Search Report for European Patent Application 10860823.3-1702, pp. 1-8, dated Jun. 6, 2017.
Benkai Xie, Qiang Zhou and Liang Yu; A Real Time Welding Training System Base on Virtual Reality; ONEW 360; Wuhan University of Technology; IEEE Virtual Reality Conference; Mar. 23-27, 2015.
"High Performance Computer Architectures_ A Historical Perspective," downloaded May 5, 2016.
http://homepages.inf.ed.ac.uk/cgi/rni/comparch.pl?Paru/perf.html,Paru/perf-f.html,Paru/menu-76.html.
Abbas, et al., Code Aster (Software) EDR (France) 14 pages, Oct. 2001.
Abbas, et al., Code_Aster; Introduction to Code_Aster; User Manual; Booket U1.0-: Introduction to Code_Aster; Document: U1.02.00; Version 7.4; Jul. 22, 2005.
Abida et al., "Numerical simulation to study the effect of tack welds and root gap on welding deformations and residual stresses of a pipe-flange joint", Faculty of Mechanical Engineering, GIK Institute of Engineering Sciences and Technology, Topi, NWFP, Pakistan. Available online Aug. 25, 2005.
Adams, et al., "Adaptively sampled particle fluids," ACM SIGGRAPH 2007 papers, Aug. 5-9, 2007, San Diego, California.
Agren, "Sensor Integration for Robotic Arc Welding;" 1995; vol. 5604C of Dissertations Abstracts International p. 1123; Dissertation Abs Online (Dialog® File 35): © 2012 ProQuest Info& Learning: http://dialogweb.com/cgi/dwclient?req=1331233317524; one (1) page; printed Mar. 8, 2012.
Aidun et al., Penetration in Spot GTA Welds during Centrifugation, Journal of Materials Engineering and Performance Volumn 7(5) Oct. 1998—597.
Aidun, D., "Influence of Simulated High-g on the Weld Size of Al—Li Alloy" Elevator Science Ltd.; 2001; 4 pages.
Aiteanu et al., "Generation and Rendering of a Virtual Welding Seam in an Augmented Reality Training Environment" Proceedings of the Sixth IASTED International Conference, Aug. 2006, 8 pages.
Aiteanu, "Virtual and Augmented Reality Supervisor for a New Welding Helmet" Dissertation Nov. 15, 2005.
Aiteanu, et al., "A Step Forward in Manual Welding:; Demonstration of Augmented Reality Helmet" Institute of Automation, University of Bremen,; Germany, Proceedings of the Second IEEE and ACM International Symposium on Mixed and; Augmented Reality; 2003; 2 pages.
Aiteanu, et al., "Computer-Aided Manual Welding Using an Augmented; Reality Supervisor" Sheet Metal Welding Conference XII, Livonia, MI, May 9-12, 2006, 14 pages.
American Welding Society Advance Program of Programs and Events. Nov. 11-14, 2007. 31 pages. Chicago, IL.
American Welding Society Detroit Section, "Sheet Metal Welding Conference XII", May 2006, 11 pages.

American Welding Society, "Vision for Welding Industry"; 41 pages, Estimated Jan. 1998.
American Welding Society, ANSI/A WS D 10.11 MID 10. 11 :2007 Guide for Root Pass Welding of Pipe without Backing Edition: 3rd American Welding Society / Oct. 13, 2006/36 pages ISBN: 0871716445.
American Welding Society, http://www.nsrp.org/6-presentations/WDVirtual_Welder. pdf (Virtual Reality Welder Training,; Project No. SI051, Navy ManTech Program, Project Review for Ship Tech 2005); 22 pages.; Biloxi, MS.
American Welding Society, https://app.aws.org/conferences/defense/live index.html (AWS Welding in the Defense; Industry conference schedule, estimated Jan. 2004); 12 pages.
American Welding Society, https://app.aws.org/w/r/www/wj/2005/03/WJ_2005_03.pdf (AWS Welding Journal, Mar. 2005; (see, e.g., p. 54)).; 114 pages.
American Welding Society, https://app.aws.org/wj/2004/04/052/njc (AWS Virtual Reality Program to Train Welders for; Shipbuilding, workshop information, 2004); 7 pages.
American Welding Society, https://app.aws.org/wj/2007 /11/WJ200711. pdf (AWS Welding Journal, Nov. 2007); 240 pages.
American Welding Society, Welding Handbook, Welding Science & Technology, Ninth Ed., Copyright 2001. Appendix A "Terms and Definitions".
Antonelli et al, "A Semi-Automated Welding Station Exploiting Human-Robot Interaction," Advanced Manufacturing Systems and Technology (2011) pp. 249-260.
ARC+—Archived Press Release from WayBack Machine from Jan. 31, 2008-Apr. 22, 2013, Page, https://web.archive.org/web/20121006041803/http://www.123certification.com/en/article_press/index.htm, Jan. 21, 2016, 3 pages.
Arc+—simulator; http://www.123arc.com/en/depliant_ang.pdf; Estimated Jan. 2000.
Kenneth Fast; Virtual Welding—A Low Cost Virtual Reality Welder system training system phase II; NSRP ASE Technology Investment Agreement: Feb. 29. 2012: pp. 1-54.
ArcSentry Weld Quality Monitoring System; Native American Technologies, allegedly 2002, 5; pages.
ARS Electronica Linz GMBH, Fronius, 2 pages, May 18, 1997.
Arvika Forum Vorstellung Projekt PAARi. BMW Group Virtual Reality Center. 4 pages.; Nuernberg. 2003.
asciencetutor.com, A division of Advanced Science and Automation Corp., VWL (Virtual Welding Lab), 2 pages, 2007.
ASME Definitions, Consumables, Welding Positions, dated Mar. 19, 2001. See http://www.gowelding.com/wp/asme4.htm.
Balijepalli, et al. "Haptic Interfaces for Virtual Environment and Teleoperator Systems," Haptics 2003, Department of Mechanical & Aerospace Engineering, State University of New York at Buffalo, NY.
Bargteil, et al., "A semi-lagrangian contouring method for fluid simulation," ACM Transactions on Graphics, 25(1), 2006.
Bargteil, et al., "A texture synthesis method for liquid animations," In Proceedings of the ACM SIGGRAPH/Eurographics Symposium on Computer Animation, Sep. 2006.
Bender Shipbuilding and Repair Co. Virtual Welding—A Low Cost Virtual Reality Welding; Training System. Proposal submitted pursuant to MSRP Advanced Shipbuilding Enterprise; Research Announcement, Jan. 23, 2008. 28 pages, See also, http://www.nsrp.org/6-; Presentations/WD/020409 Virtual Welding Wilbur.pdf;;.
Borzecki, et al., Specialist Committee V.3 Fabrication Technology Committee Mandate, Aug. 20-25, 2006, 49 pages, vol. 2, 16th International Ship and Offshore Structures Congress, Southampton, UK.
Catalina, et al., "Interaction of Porosity with a Planar Solid/Liquid Interface" ("Catalina"), Metallurgical and Materials Transactions, vol. 35A, May 2004, pp. 1525-1538.
ChemWeb.com—Journal of Materials Engineering (printed Sep. 26, 2012) (01928041).
Chen, et al., "Self-Learning Fuzzy Neural Networks and Computer Vision for Control of Pulsed GTAW," dated May 1997.
Chentanez, et al., "Liquid simulation on lattice-based tetrahedral meshes." In ACM SIGGRAPH/Eurographics Symposium on Computer Animation 2007, pp. 219-228, Aug. 2007.

(56) References Cited

OTHER PUBLICATIONS

Chentanez, et al., "Simultaneous coupling of fluids and deformable bodies," In ACM SIGGRAPH/Eurographics Symposium on Computer Animation, pp. 83-89, Aug. 2006.
Choquet, C., "ARC+: Today's Virtual Reality Solution for Welders" Internet Page, Jan. 1, 2008; 6 pages.
Choquet, C., "ARC+®: Today's Virtual Reality Solution for Welders", Published in Proceedings of the IIW Internatioal Conference; Jul. 10-11, 2008; 19 pages.
Clausen, et al., "Simulating liquids and solid-liquid interactions with lagrangian meshes," ACM Transactions on Graphics, 32(2):17:1-15, Apr. 2013. Presented at SIGGRAPH 2013.
Cooperative Research Program, Virtual Reality Welder Training, Summary Report SR 0512, 4 pages, Jul. 2005.
CS Wave, the Virtual Welding Trainer, 6 pages, 2 estimated Jan. 2007.
CS Wave-Manual, "Virtual Welding Workbench User Manual 3.0" estimated Jan. 2007.
CUDA Programming Guide Version 1.1, Nov. 29, 2007.
Da Dalto, et al. "CS Wave, A Virtual learning tool for welding motion", 10 pages, Mar. 14, 2008.
Da Dalto, et al. "CS Wave: Learning welding motion in a virtual environment" Published in Proceedings of the IIW International Conference, Jul. 10-11, 2008.
Desroches, X.; Code-Aster, Note of use for aclculations of welding; Instruction manual U2.03 booklet: Thermomechanical; Document: U2.03.05; Oct. 1, 2003.
D'Huart, et al., "Virtual Environment for Training" 6th International Conference, ITS 20002, Jun. 2002; 6 pages.
Dotson, "Augmented Reality Welding Helmet Prototypes How Awesome the Technology Can Get," Sep. 26, 2012, Retrieved from the Internet: URL:http://siliconangle.com/blog/2012/09/26/augmented-reality-welding-helmet-prototypes-how-awesome-the-technology-can-get/,retrieved on Sep. 26, 2014, 1 page.
Echtler et al, "17 The Intelligent Welding Gun: Augmented Reality for Experimental Vehicle Construction," Virtual and Augmented Reality Applications in Manufacturing (2003) pp. 1-27.
Edison Welding Institute, E-Weld Predictor, 3 pages, 2008.
Eduwelding+, Training Activities with arc+ simulator; Weld Into the Future, Online Welding Simulator—A virtual training environment; 123arc.com; 6 pages, May 2008.
Eduwelding+, Weld Into the Future; Online Welding Seminar—A virtual training environment; 123arc.com; 4 pages, 2005.
Energetics, Inc. "Welding Technology Roadmap", Sep. 2000, 38 pages.
Fast, K. et al., "Virtual Training for Welding", Mixed and Augmented Reality, 2004, ISMAR 2004, Third IEEE and CM International Symposium on Arlington, VA, Nov. 2-5, 2004.
Feldman, et al., "Animating Suspended Particle Explosions". In Proceedings of ACM SIGGRAPH 2003, pp. 708-715, Aug. 2003.
Feldman, et al., "Fluids in deforming meshes" In ACM SIGGRAPH/Eurographics Symposium on Computer Animation 2005, Jul. 2005.
Fite-Georgel, "Is there a Reality in Industrial Augmented Reality?" 10th IEEE International Symposium on Mixed and Augmented Reality (ISMAR). 10 pages, allegedly 2011.
Foster, et al., "Realistic animation of liquids," Graphical Models and Image Processing, v.58 n.5, p. 471-483, Sep. 1996.
Foster, et al., "Practical animation of liquids," Proceedings of the 28th annual conference on Computer graphics and interactive techniques, p. 23-30, Aug. 2001.
Garcia-Allende, et al., "Defect Detection in Arc-Welding Processes by Means of the Line-to-Continuum Method and Feature Selection" www.mdpi.com/journal/sensors; Sensors 2009, 9, 7753-7770; DOI; 10.3390/s91007753.
Goktekin, et al., "A Method for Animating Viscoelastic Fluids". ACM Transactions on Graphics (Proc. of ACM SIGGRAPH 2004), 23(3):463-468, 2004.
Graham, "Texture Mapping" Carnegie Mellon University Class 15-462 Computer graphics, Lecture 10 dated Feb. 13, 2003; 53 pages.

Grahn, A., "Interactive Simulation of Contrast Fluid using Smoothed Particle Hydrodynamics," Jan. 1, 2008, Master's Thesis in Computing Science, Umeå University, Department of Computing Science, Umeå, Sweden.
Guu et al., "Technique for Simultaneous Real-Time Measurements of Weld Pool Surface Geometry and Arc Force," Dec. 1992.
Heston, Virtually Welding—raining in a virtual environment gives welding students a leg up, retrieved on Apr. 12, 2010 from: http://www.thefabricator.com/article/arcwelding/virtually-welding.
Hillers, et al., "Augmented Reality—Helmet for the Manual; Welding Process" Institute of Automation, University of Bremen, Germany; 21 pages, 2004.
Hillers, et al., "Direct welding arc observation without harsh flicker," 8 pages, allegedly FABTECH International and AWS welding show, 2007.
Hillers, et al., "Real time Arc-Welding Video Observation System." 62nd International Conference of IIW, Jul. 12-17, 2009, 5 pages Singapore 2009.
Hillers, et al., "TEREBES:; Welding Helmet with AR Capabilities", Institute of Automatic University Bremen; Institute of; Industrial Engineering and Ergonomics, 10 pages, allegedly 2004.
Hillis, et al., "Data Parallel Algorithms", Communications of the ACM, Dec. 1986, vol. 29, No. 12, p. 1170.
Hirche, et al. "Hardware Accelerated Per-Pixel Displacement Mapping" University of Tubingen, Germany, Alexander Ehlert, Stefan Guthe, WStlGRfS & Michael Doggett, ATI Research; 8 pages.
Holmberg et al, "Efficient modeling and rendering of turbulent water over natural terrain," In Proceedings of the 2nd international conference on Computer graphics and interactive techniques in Australasia and South East Asia (GRAPHITE '04) 2004.
Sun Yaoming; Application of Micro Computer in Robotic Technologies; Science and Technology Literature Press; Catalogue of New Books of Science and Technology; Sep. 1987, pp. 360-363.
Hu et al. "Heat and mass transfer in gas metal arc welding. Part 1: the arc" found in ScienceDirect, International Journal of Heat and Mass transfer 50 (2007) 833-846 Available on Line on Oct. 24, 2006 http://web.mst.edu/~tsai/publications/Hu-IJHMT-2007-1-60.pdf.
Impact Welding: examples from current and archived website, trade shows, etc. See, e.g.,; http://www.impactweldinq.com. 53 pages; estimated Jan. 2000.
Irving, et al., "Efficient simulation of large bodies of water by coupling two and three dimensional techniques," ACM SIGGRAPH 2006 Papers, Jul. 30-Aug. 3, 2006, Boston, Massachusetts.
Jeffus, "Welding Principles and Applications" Sixth Edition, 2008, 10 pages.
Jonsson et al. "Simulation of Tack Welding Procedures in Butt Joint Welding of Plates" Research Supplement, Oct. 1985.
Kass, et al., "Rapid, Stable Fluid Dynamics for Computer Graphics," Proceedings of SIGGRAPH '90, in Computer Graphics, vol. 24, No. 4, pp. 49-57, 1990.
Klingner, et al., "Fluid animation with dynamic meshes," In Proceedings of ACM SIGGRAPH 2006, pp. 820-825, Aug. 2006.
Kobayashi, et al., "Simulator of Manual Metal Arc Welding with Haptic Display" ("Kobayashi 2001"), Proc. of the 11th International Conf. on Artificial Reality and Telexistence (ICAT), Dec. 5-7, 2001, pp. 175-178, Tokyo, Japan.
Kobayashi, et al., "Skill Training System of Manual Arc Welding by Means of Face-Shield-Like HMD and Virtual Electrode" ("Kobayashi 2003"), Entertainment Computing, vol. 112 of the International Federation for Information Processing (IFIP), Springer Science + Business Media, New York, copyright 2003, pp. 389-396.
Lincoln Global, Inc., "VRTEX 360: Virtual Reality Arc Welding Trainer" Brochure (2015) 4 pages.
Lindholm, et al., "NVIDIA Testla: A Unifired Graphics and Computing Architecture", IEEE Computer Society, 2008.
Mahrle, A., et al.; "The influence of fluid flow phenomena on the laser beam welding process" International Journal of Heat and Fluid Flow 23 (2002, No. 3, pp. 288-297; Institute of Fluid Dynamics and Thermodynamics, Otto-von-Guericke University Magdeburg, P.O. Box 4120, D-39016 Magdeburg, Germany.
Mann, et al., "Realtime HDR (High Dynamic Range) Video for Eyetap Wearable Computers, FPGA-Based Seeing Aids, and Glas-

(56) References Cited

OTHER PUBLICATIONS seyes (EYETAPS)," 2012 25th IEEE Canadian Conference on Electrical and Computer Engineering (CCECE),pp. 1-6, Apr. 29, 2012, 6 pages.
Mantinband, et al., "Autosteroscopic, field- sequential display with full freedom of movement OR Let the display were the shutter -glasses," 3ality (Israel) Ltd., 2002.
Mavrikios D et al, A prototype virtual reality-based demonstrator for immersive and interactive simulation of welding processes, International Journal of Computer Integrated manufacturing, Taylor and Francis, Basingstoke, GB, vol. 19, No. 3, Apr. 1, 2006, pp. 294-300.
Miller Electric Mfg. Co, "LiveArc: Welding Performance Management System" Owner's Manual, (Jul. 2014) 64 pages.
Miller Electric Mfg. Co., "LiveArc Welding Performance Management System" Brochure, (Dec. 2014) 4 pages.
Miller Electric Mfg. Co.; MIG Welding System features weld monitoring software; NewsRoom 2010 (Dialog® File 992); © 2011 Dialog. 2010; http://www.dialogweb.com/cgi/dwclient?reg=1331233430487; three (3) pages; printed Mar. 8, 2012.
Moore, "No exponential is forever: but 'Forever' can be delayed!," IEEE International Solid-State Circuits Conference, 2003.
Müller, et al., "Particle-based fluid simulation for interactive applications," Proceedings of the 2003 ACM SIGGRAPH/Eurographics symposium on Computer animation, Jul. 26-27, 2003, San Diego, California.
Müller, et al., "Point Based Animation of Elastic, Plastic and Melting Objects," Eurographics/ACM SIGGRAPH Symposium on Computer Animation (2004).
N. A. Tech., P/NA.3 Process Modeling and Optimization, 11 pages, Jun. 4, 2008.
Nasios, "Improving Chemical Plant Safety Training Using Virtual Reality," Thesis submitted to the University of Nottingham for the Degree of Doctor of Philosophy, Dec. 2001.
Nealen, A., "Point-Based Animation of Elastic, Plastic, and Melting Objects," CG topics, Feb. 2005.
Nordruch, et al., "Visual Online Monitoring of PGMAW Without a Lighting Unit", Jan. 2005.
NSRP ASE, Low-Cost Virtual Realtiy Welder Training System, 1 Page, 2008.
O'Brien et al.,"Dynamic Simulation of Splashing Fluids". In Proceedings of Computer Animation 95, pp. 198-205, Apr. 1995.
O'Brien, "Google's Project Glass gets some more details", Jun. 27, 2012 (Jun. 27, 2012), Retrieved from the Internet: http://www.engadget.com/2012/06/27/googles-project-glass-gets-some-more-details/, retrieved on Sep. 26, 2014, 1 page.
P/NA.3 Process Modelling and Optimization; Native American Technologies, allegedly 2002,; 5 pages.
Penrod, "New Welder Training Tools." EWI PowerPoint presentation; 16 pages allegedly 2008.
Phar, "GPU Gems 2 Programming Techniques for High-Performance Graphics and General-Purpose Computation," 2005, 12 pages.
Porter, et al. Virtual Reality Welder Trainer, Session 5: Joining Technologies for Naval Applications: earliest date Jul. 14, 2006 (http://weayback.archive.org) Edision Welding Institute; J. Allan Cote, General Dynamics Electric Boat; Timothy D. Gifford, VRSim, and Wim Lam, FCS Controls.
Porter, et al., Virtual Reality Training, Paper No. 2005-P19, 14 pages, 2005.
Porter, et al., Virtual Reality Training, vol. 22, No. 3, Aug. 2006; 13 pages.
Porter, et al., Virtual Reality Welder Training, dated Jul. 14, 2006.
Praxair Technology Inc., "The RealWeld Trainer System: Real Weld Training Under Real Conditions" Brochure (Est. Jan. 2013) 2 pages.
Premoze, et al., "Particle-based simulation of fluids," Comput. Graph. Forum 22, 3, 401-410, 2003.
Rasmussen, et al., "Directable photorealistic liquids," Proceedings of the 2004 ACM SIGGRAPH/Eurographics symposium on Computer animation, Aug. 27-29, 2004, Grenoble, France.

Ratnam, et al., "Automatic classification of weld defects using simulated data and an Mlp neutral network." Insight vol. 49, No. 3; Mar. 2007.
Reeves, "Particles Systems—A Technique for Modeling a Class of Fuzzy Objects", Computer Graphics 17:3 pp. 359-376, 1983.
Renwick, et al., "Experimental Investigation of GTA Weld Pool Oscillations" Welding Research—Supplement to the Welding Journal, Feb. 1983, 7 pages.
Rodjito, "Position tracking and motion prediction using Fuzzy Logic," 2006, Colby College.
Russel, et al., "Artificial Intelligence: A Modern Approach", Prentice-Hall (Copywrite 1995).
Sandor, et al., "Lessons Learned in Designing Ubiquitous Augmented; Reality User Interfaces." 21 pages, allegedly from Emerging Technologies of Augmented; Reality: Interfaces Eds. Haller, M.; Billinghurst, M.; Thomas, B. Idea Group Inc. 2006.
Sandor, et al., "PAARTI: Development of an Intelligent Welding Gun for; BMW." PIA2003, 7 pages, Tokyo. 2003.
Sandter, et al. Fronius—virtual welding, FH JOANNEUM, Gesellschaft mbH, University of; Annlied Sciences 2 pages, May 12, 2008.
Schoder, "Design and Implementation of a Video Sensor for Closed Loop Control of Back Bead Weld Puddle Width," Massachusetts Institute of Technology, Dept. of Mechanical Engineering, May 27, 1983.
Screen Shot of CS Wave Control Centre V3.0.0 https://web.archive.org/web/20081128081915/http:/wave.c-s.fr/images/english/snap_evolution4.jpg; Estimated Jan. 2007.
Screen Shot of CS Wave Control Centre V3.0.0 https://web.archive.org/web/20081128081817/http:/wave.c-s.fr/images/english/snap_evolution6.jpg, estimated Jan. 2007.
Screen Shot of CS Wave Exercise 135.FWPG Root Pass Level 1 https://web.archive.org/web/20081128081858/http:/wave.c-s.fr/images/english/snap_evolution2.jpg, estimated Jan. 2007.
SimWelder, retrieved on Apr. 12, 2010 from: http://www.simwelder.com.
SIMFOR / CESOL, "RV-SOLD" Welding Simulator, Technical and Functional Features, 20 pages, estimated Jan. 2010.
Slater, et al., "Mechanisms and Mechanical Devices Sourcebook," McGraw Hill; 2nd Addition, 1996.
Stam, J., "Stable fluids," Proceedings of the 26th annual conference on Computer graphics and interactive techniques, p. 121-128, Jul. 1999.
SWANTEC corporate web page downloaded Apr. 19, 2016. http://www.swantec.com/technology/numerical-simulation/.
Tamasi, T., "The Evolution of Computer Graphics," NVIDIA, 2008.
Teeravarunyou, et al, "Computer Based Welding Training System," International Journal of Industrial Engineering (2009) 16(2): 116-125.
Terebes: examples from http://www.terebes.uni-bremen.de.; 6 pages.
The Fabricator, Virtual Welding, 4 pages, Mar. 2008.
The Lincoln Electric Company, "VRTEX Virtual Reality Arc Welding Trainer," http://www.lincolnelectric.com/en-us/equipment/training-equipment/Pages/vrtex.aspx as accessed on Jul. 10, 2015, 3 pages.
The Lincoln Electric Company, Production Monitoring 2 brochure, 4 pages, May 2009.
The Lincoln Electric Company; CheckPoint Production Monitoring borchure; four (4) pages; http://www.lincolnelectric.com/assets/en_US/products/literature/s232.pdf; Publication S2.32; Issue Date Feb. 2012.
Thurey, et al., "Real-time Breaking Waves for Shallow Water Simulations," In Proceedings of the 15th Pacific Conference on Computer Graphics and Applications (PG '07) 2007.
Tonnesen, D., "Modeling Liquids and Solids using Thermal Particles," Proceedings of Graphics Interface'91, pp. 255-262, Calgary, Alberta, 1991.
Tschirner, et al., "Virtual and Augmented Reality for Quality Improvement of Manual Welds" National Institute of Standards and Technology, Jan. 2002, Publication 973, 24 pages.
Tschirner, et al, "A Concept for the Application of Augmented Reality in Manual Gas Metal Arc Welding." Proceedings of the International Symposium on Mixed and Augmented Reality; 2 pages; 2002.

(56) References Cited

OTHER PUBLICATIONS

Vesterlund, M., "Simulation and Rendering of a Viscous Fluid using Smoothed Particle Hydrodynamics," Dec. 3, 2004, Master's Thesis in Computing Science, Umeå University, Department of Computing Science, Umeå, Sweden.
Viega, et al. "Simulation of a Work Cell in the IGRIP Program" dated 2006; 50 pages.
Virtual Welding: A Low Cost Virtual Reality Welder Training System, NSRP RA 07-01—BRP Oral Review Meeting in Charleston, SC at ATI, Mar. 2008.
ViziTech USA, "Changing the Way America Learns," http://vizitechusa.com/ accessed on Mar. 27, 2014; 2 pages.
VRSim Inc. "About Us—History" www.vrsim.net/history, 2016, 1 page.
VRSim Powering Virtual Reality, www.lincolnelectric.com/en-us/equipmenl/lraining-equipmenl/Pages/powered-by-; 'rsim.aspx, 2016, 1 page.
Wade, "Human uses of ultrasound: ancient and modern", Ultrasonics vol. 38, dated 2000.
Wahi, et al., "Finite-Difference Simulation of a Multi-Pass Pipe Weld" ("Wahi"), vol. L, paper 3/1, International Conference on Structural Mechanics in Reactor Technology, San Francisco, CA, Aug. 15-19, 1977.
Wang, et al. "Numerical Analysis of Metal Tranfser in Gas Metal Arc Welding, " Departements of Mechanical and Electrical Engineering. University of Kentucky, Dec. 10, 2001.
Wang, et al., "Impingement of Filler Droplets and Weld Pool During Gas Metal Arc Welding Process" International Journal of Heat and Mass Transfer, Sep. 1999, 14 pages.
Wang, et al., "Study on welder training by means of haptic guidance and virtual reality for arc welding," 2006 IEEE International Conference on Robotics and Biomimetics, ROBIO 2006 ISBN-10: 1424405718, p. 954-958.
Webster's II new college dictionary, 3rd ed., Houghton Mifflin Co., copyright 2005, Boston, MA, p. 1271, definition of "wake."
White, et al., Virtual welder training, 2009 IEEE Virtual Reality Conference, p. 303, 2009.
Wu, "Microcomputer-based welder training simulator", Computers in Industry, vol. 20, No. 3, Oct. 1992, pp. 321-325, XP000205597, Elsevier Science Publishers, Amsterdam, NL.
Wuhan ONEW Technology Co Ltd, "ONEW-360 Welding Training Simulator" http://en.onewtech.com/_d276479751.htm as accessed on Jul. 10, 2015, 12 pages.
Yao, et al., "Development of a Robot System for Pipe Welding" 2010 International Conference on Measuring Technology and Mechatronics Automation. Retrieved from the Internet: http://ieeexplore.ieee.org/stamp/stamp.jsp?tp=&arnumber=5460347&tag=1; pp. 1109-1112.
Yoder, Fletcher, Opinion RE45398 and U.S. Appl. No. 14/589,317, including Appendices ; Sep. 9, 2015; 1700 pages.
United States Provisional Patent Application for "System for Characterizing Manual Welding Operations on Pipe and Other Curved Structures," U.S. Appl. No. 62/055,724, filed Sep. 26, 2014, 35 pages.
Office Action from U.S. Appl. No. 14/526,914 dated Feb. 3, 2017.
Arc Simulation & Certification, Weld Into the Future, 4 pages, 2005, Jan. 2008.
International Search Report and Written Opinion from PCT/IB10/02913 dated Apr. 19, 2011.
International Search Report for PCT/IB2014/001796, dated Mar. 24, 3016; 8 pages.
International Search Report for PCT/IB2015/000161, dated Aug. 25, 2016; 9 pages.
International Search Report for PCT/IB2015/000777, dated Dec. 15, 2016; 11 pages.
International Search Report for PCT/IB2015/000814 dated Dec. 15, 2016; 9 pages.
International Preliminary Report from PCT/IB2015/001084 dated Jan. 26, 2017.
Petition for Inter Partes Review of U.S. Pat. No. 8,747,116; IPR 2016-00749; Apr. 7, 2016; 70 pages.
Declaration of Edward Bohnart, Apr. 27, 2016, exhibit to IPR 2016-00749.
Declaration of Dr. Michael Zyda, May 3, 2016, exhibit to IPR 2016-00749.
Trial Denied IPR Proceeding of U.S. Pat. No. 8,747,116; IPR 2016-00749; Sep. 21, 2016; 21 pages.
Petition for Inter Partes Review of U.S. Pat. No. RE45,398; IPR 2016-00840; Apr. 18, 2016; 71 pages.
Declaration of AxelGraeser, Apr. 17, 2016, exhibit to IPR 2016-00840; 88 pages.
Decision Denying Request for Rehearing of U.S. Pat. No. RE45398; IPR 2016-00840; Nov. 17, 2016; 10 pages.
Petition for Inter Partes Review of U.S. Pat. No. 8,747,116; IPR 2016-01568; Aug. 9, 2016; 75 pages.
Decision Termination Proceeding of U.S. Pat. No. 8,747,116; IPR 2016-01568; Nov. 15, 2016; 4 pages.
Petition for Inter Partes Review of U.S. Pat. No. 9,293,056; IPR 2016-00904; May 9, 2016; 91 pages.
Declaration of Edward Bohnart, Apr. 27, 2016, exhibit to IPR 2016-00904; 22 pages.
Declaration of Dr. Michael Zyda, May 3, 2016, exhibit to IPR 2016-00904; 76 pages.
Decision Trial Denied IPR Proceeding of U.S. Pat. No. 9,293,056; IPR 2016-00904; Nov. 3, 2016; 15 pages.
Petition for Inter Partes Review of U.S. Pat. No. 9,293,057; IPR 2016-00905; May 9, 2016; 87 pages.
Declaration of Edward Bohnart, Apr. 27, 2016, exhibit to IPR 2016-00905; 23 pages.
Declaration of Dr. Michael Zyda, May 3, 2016, exhibit to IPR 2016-00905; 72 pages.
Decision Trial Denied IPR Proceeding of U.S. Pat. No. 9,293,057; IPR 2016-00905; Nov. 3, 2016; 21 pages.
*Lincoln Electric Company et al v. Seabery Soluciones SL et al*—1:15-cv-01575-DCN—Complaint filed Aug. 15, 2015 (Dkt 01).
*Lincoln Electric Company et al v. Seabery Soluciones SL et al*—1:15-cv-01575-DCN—Amended Answer filed Mar. 1, 2016 by Seabery North America (docket 44).
*Lincoln Electric Company et al v. Seabery Soluciones SL et al*—1:15-cv-01575-DCN—Amended Answer filed Mar. 1, 2016 by Seabery Soluciones SL (docket 45).
*Lincoln Electric Company et al v. Seabery Soluciones SL et al*—1:15-cv-01575-DCN—Amended Answer filed Mar. 22, 2016 by Lincoln Electri c Company (docket 46).
*Lincoln Electric Company et al v. Seabery Soluciones SL et al*—1:15-cv-01575-DCN—Answer filed Mar. 22, 2016 by Lincoln Global Inc. (docket 47).
Exhibit B from Declaration of *Morgan Lincoln in Lincoln Electric Co. et al. v. Seabery Soluciones, S.L. et al.*, Case No. 1:15-cv-01575-DCN, dated Dec. 20, 2016, 5 pages.
International Serach Report and Written Opinion for International Application No. PCT/IB2009/006605.

* cited by examiner

SPRING-LOADED TIP ASSEMBLY TO SUPPORT SIMULATED SHIELDED METAL ARC WELDING

CROSS REFERENCE TO RELATED APPLICATIONS/INCORPORATION BY REFERENCE

This U.S. patent application claims priority to and the benefit of U.S. provisional patent application Ser. No. 62/513,584 filed on Jun. 1, 2017, which is incorporated herein by reference in its entirety. U.S. Pat. No. 8,915,740 entitled "Virtual Reality Pipe Welding Simulator", filed on Jul. 10, 2009 and issued on Dec. 23, 2014, is incorporated herein by reference in its entirety.

FIELD

Embodiments of the present invention relate to systems, apparatus, and methods associated with simulated welding. More specifically, embodiments of the present invention relate to systems, apparatus, and methods to support simulation of a shielded metal arc welding (SMAW) operation via a spring-loaded tip assembly.

BACKGROUND

In certain weld joints (e.g., SMAW pipe welding), the process of welding requires the user to feel the welding joint of the workpiece via the electrode being used. There is an ideal pressure that is to be applied to the weld joint to find the proper arc distance. Current professional welders feed the electrode into the joint beyond first contact to obtain proper arc length and weld deposition rate. Simulating a SMAW pipe welding process for training welding students can be difficult. With today's simulated/virtual welding training systems, an artificial electrode tip provided as part of a mock SMAW tool tends to be rigid. This results in an unrealistic simulation of the SMAW operation. For example, electrode slippage can occur at the welding coupon, there is an absence of a pressure-based welding technique, and there is a lack of proper disposition. A way to more realistically simulate a SMAW pipe welding process is desired.

SUMMARY

Embodiments of the present invention include spring-loaded tip assemblies to support simulation of a shielded metal arc welding (SMAW) operation for training student welders. The spring-loaded tip assemblies include an elongate mock electrode tip that mitigates slippage at the welding coupon and provides a pressure-based tactile feedback to the student welder.

One embodiment includes a tip assembly to support simulation of a shielded metal arc welding (SMAW) operation. The tip assembly includes an elongate mock electrode tip having a proximal end, a distal end, and a locking sleeve near the proximal end. The tip assembly also includes a compression spring having a first end and a second end. The first end is configured to interface with the proximal end of the electrode tip. The tip assembly further includes a locking cup configured to encompass the compression spring and the locking sleeve of the electrode tip. The tip assembly also includes a housing having an orifice. The housing is configured to receive the electrode tip, the compression spring, and the locking cup into the housing by accepting the distal end of the electrode tip through the orifice of the housing up to the locking sleeve. The result is that the compression spring, the locking cup, and the locking sleeve reside in an interior of the housing with a majority of the electrode tip protruding out of the housing. The locking sleeve and the locking cup are configured to be rotated with respect to each other to allow changing between a locked position and an unlocked position. In one embodiment, the locked position holds the compression spring in a fully compressed state within the locking cup while holding the electrode tip in an immovable state with respect to the locking cup and the housing, for use in simulated shielded metal arc welding of a plate welding coupon. The unlocked position puts the compression spring in a free state. The free state allows the compression spring to compress as the distal end of the electrode tip is pushed toward the housing. The free state also allows the compression spring to decompress to push the distal end of the electrode tip away from the housing. The result is that a tactile feedback is provided to a student welder to simulate a feel of performing an actual shielded metal arc welding operation on a pipe as the electrode tip engages a pipe welding coupon during a simulated shielded metal arc welding operation. In one embodiment, the housing is configured to removably attach to a mock welding tool for use in a SMAW operation. In one embodiment, the distal end of the electrode tip is made of a material configured to mitigate slippage between the electrode tip and a welding coupon during a simulated SMAW operation. For example, at least a portion of the electrode tip may be made of polyoxymethylene. In one embodiment, at least a portion of the compression spring is made of polyetherimide.

One embodiment includes a tip assembly to support simulation of a shielded metal arc welding operation. The tip assembly includes an elongate mock electrode tip having a proximal end, a distal end, and a sleeve near the proximal end. The tip assembly also includes a compression spring having a first end and a second end. The first end is configured to interface with the proximal end of the electrode tip. The tip assembly further includes a pressure sensor transducer configured to interface with the second end of the compression spring to sense an amount of compression of the compression spring and to generate a signal indicating the amount of compression of the compression spring. The tip assembly also includes a cup configured to encompass the pressure sensor transducer, the compression spring, and the sleeve of the electrode tip. The tip assembly further includes a housing having an orifice. The housing is configured to receive the electrode tip, the compression spring, the pressure sensor transducer, and the cup into the housing by accepting the distal end of the electrode tip through the orifice of the housing up to the sleeve. The result is that the pressure sensor transducer, the compression spring, the cup, and the sleeve reside in an interior of the housing with a majority of the electrode tip protruding out of the housing. In one embodiment, the signal indicating the amount of compression of the compression spring is representative of at least one simulated arc characteristic. The simulated arc characteristic may include, for example, an arc voltage, an arc current, an arc length, or an extinguished arc. In one embodiment, the sleeve and the cup are configured to be rotated with respect to each other to allow changing between a locked position and an unlocked position. In one embodiment, the locked position holds the compression spring in a fully compressed state within the locking cup while holding the electrode tip in an immovable state with respect to the locking cup and the housing, for use in simulated shielded metal arc welding of a plate welding coupon. The unlocked position puts the compression spring in a free state. The free state allows the compression spring to compress as the distal end of the electrode tip is pushed toward the housing. The free state also allows the compression spring to decompress to push the distal end of the electrode tip away from the housing. The result is that a tactile feedback is provided to a student welder to simulate a feel of performing an actual shielded metal arc welding operation on a pipe as the electrode tip engages a pipe welding coupon during a simulated shielded metal arc welding operation.

One embodiment includes a mock welding tool to support simulation of a SMAW operation. The mock welding tool includes a handle configured to be held by a student welder and a trigger operatively connected to the handle and configured to indicate an active weld state to a welding simulator. The mock welding tool also includes a mock stick electrode having a tip assembly. The tip assembly includes an elongate mock electrode tip having a proximal end, a distal end, and a locking sleeve near the proximal end. The tip assembly also includes a compression spring having a first end and a second end. The first end is configured to interface with the proximal end of the electrode tip. The tip assembly further includes a locking cup configured to encompass the compression spring and the locking sleeve of the electrode tip. The tip assembly also includes a housing having an orifice. The housing is configured to receive the electrode tip, the compression spring, and the locking cup into the housing by accepting the distal end of the electrode tip through the orifice of the housing up to the locking sleeve. The result is that the compression spring, the locking cup, and the locking sleeve reside in an interior of the housing with a majority of the electrode tip protruding out of the housing. The locking sleeve and the locking cup are configured to be rotated with respect to each other to allow changing between a locked position and an unlocked position. In one embodiment, the locked position holds the compression spring in a fully compressed state within the locking cup while holding the electrode tip in an immovable state with respect to the locking cup and the housing, for use in simulated shielded metal arc welding of a plate welding coupon. The unlocked position puts the compression spring in a free state. The free state allows the compression spring to compress as the distal end of the electrode tip is pushed toward the housing. The free state also allows the compression spring to decompress to push the distal end of the electrode tip away from the housing. The result is that a tactile feedback is provided to a student welder to simulate a feel of performing an actual shielded metal arc welding operation on a pipe as the electrode tip engages a pipe welding coupon during a simulated shielded metal arc welding operation. In one embodiment, the mock welding tool includes at least one sensor to aid the welding simulator in tracking the mock welding tool in at least position and orientation in three-dimensional space. In one embodiment, the mock welding tool includes an actuator assembly configured to retract the mock stick electrode toward the student welder, in response to the student welder activating the trigger, to simulate consumption of a real stick electrode. In one embodiment, the mock welding tool includes a communication module configured to communicate with the welding simulator. Communication may be wireless or via a cable connected between the mock welding tool and the welding simulator.

Numerous aspects of the general inventive concepts will become readily apparent from the following detailed description of exemplary embodiments, from the claims, and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
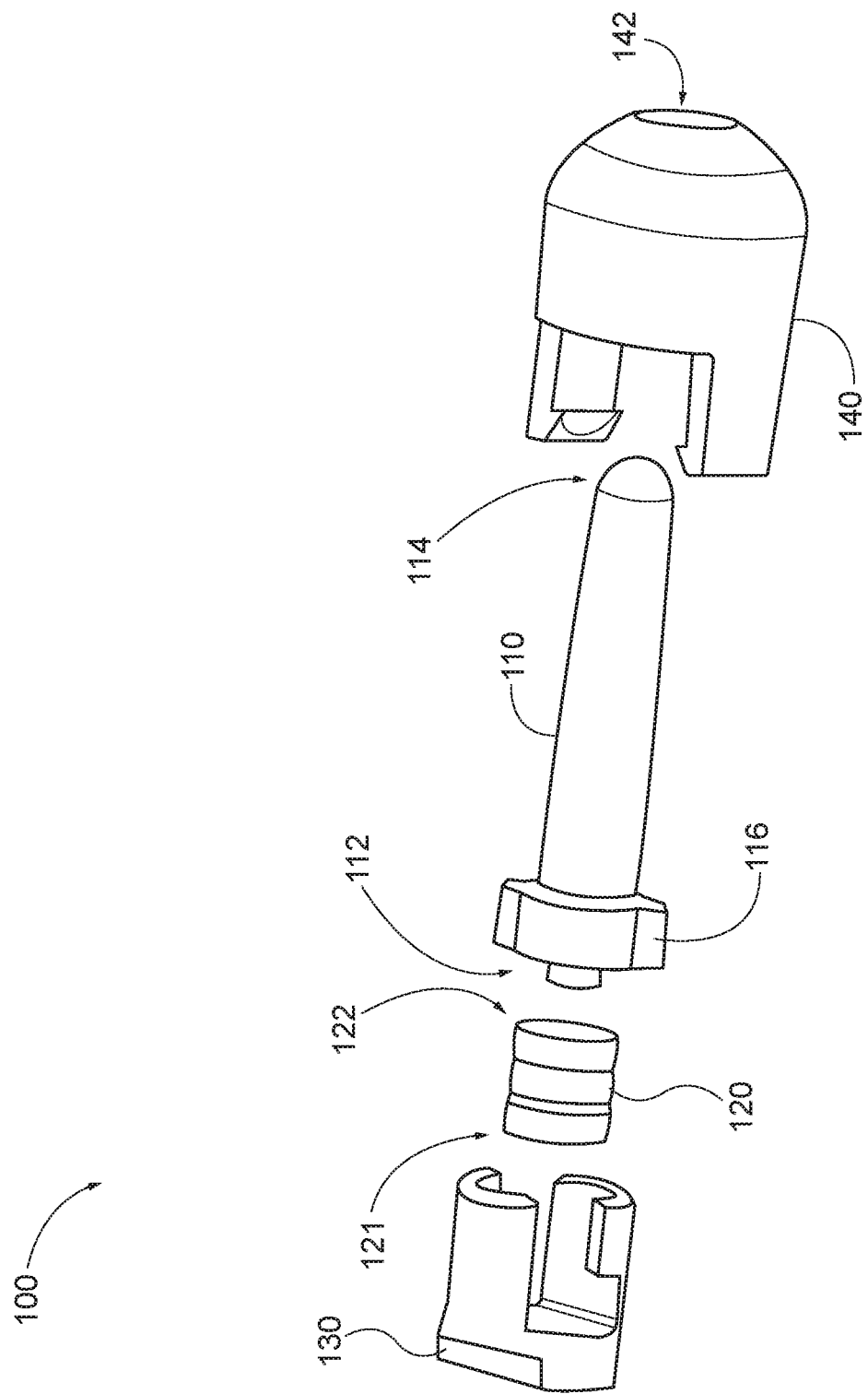
FIG. 1 illustrates an exploded view of a first embodiment of a spring-loaded tip assembly to support a simulated SMAW operation.

Embodiments of systems, apparatus, and methods to support simulation of a shielded metal arc welding (SMAW) operation via a spring-loaded tip assembly are disclosed. In one embodiment, a welding simulator is provided which includes a mock welding tool having a tip assembly. The tip assembly includes an elongate mock electrode tip having a proximal end, a distal end, and a locking sleeve near the proximal end. A compression spring is configured to interface with the proximal end of the electrode tip. A locking cup is configured to encompass the compression spring and the locking sleeve. A housing, having an orifice, is configured to receive the electrode tip, the compression spring, and the locking cup into an interior of the housing by accepting the distal end of the electrode tip through the orifice up to the locking sleeve. The locking sleeve and the locking cup are configured to be rotated with respect to each other to allow changing between a locked position and an unlocked position.

The examples and figures herein are illustrative only and are not meant to limit the subject invention, which is measured by the scope and spirit of the claims. Referring now to the drawings, wherein the showings are for the purpose of illustrating exemplary embodiments of the subject invention only and not for the purpose of limiting same, FIG. 1 illustrates an exploded view of a first embodiment of a spring-loaded tip assembly 100 to support a simulated SMAW operation.

Referring to FIG. 1, the tip assembly 100 includes an elongate mock electrode tip 110. The electrode tip 110 has a proximal end 112, a distal end 114, and a locking sleeve 116 near the proximal end 112. The tip assembly 100 also includes a compression spring 120 having a first end 122 and a second end 124. The first end 122 is configured to interface with the proximal end 112 of the electrode tip 110. For example, as shown in FIG. 1, a male/female type of interface is provided. The tip assembly 100 includes a locking cup 130 configured to encompass the compression spring 120 and the locking sleeve 116 of the electrode tip 110.

Figure 2:
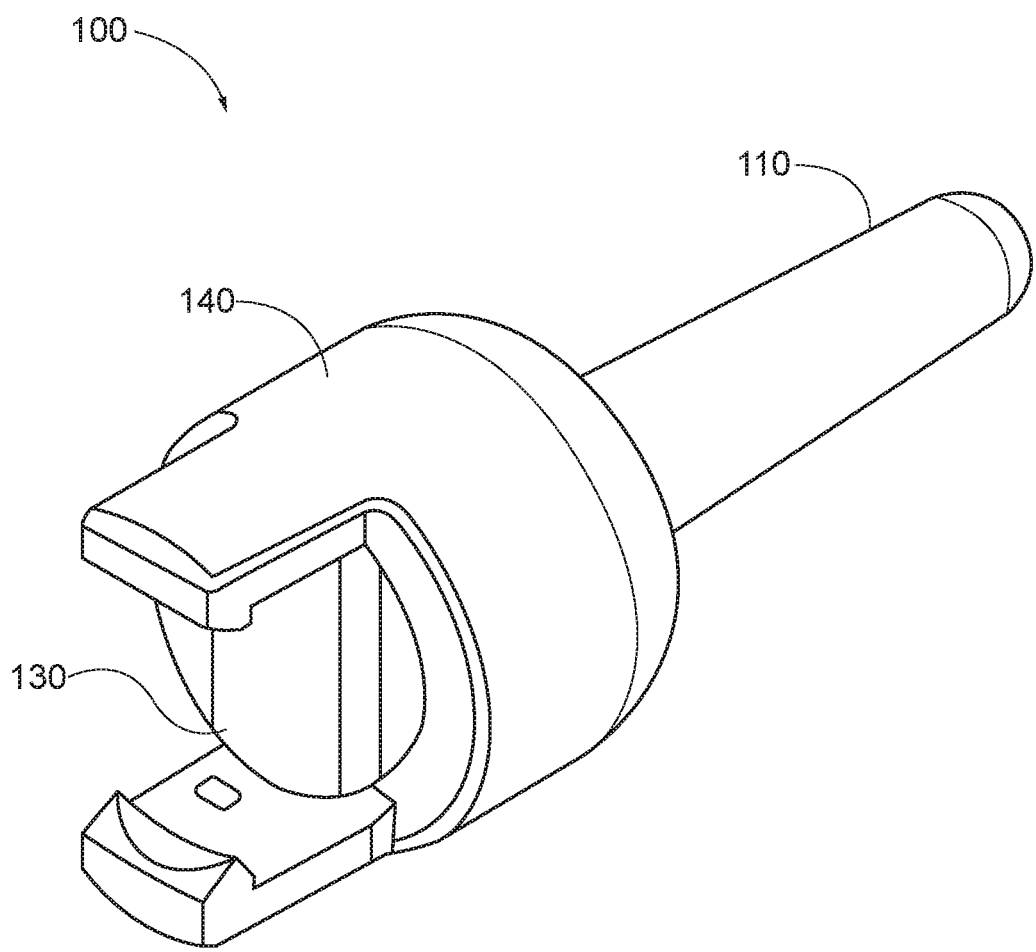
FIG. 2 illustrates a first assembled view of the embodiment of FIG. 1.
Figure 3:
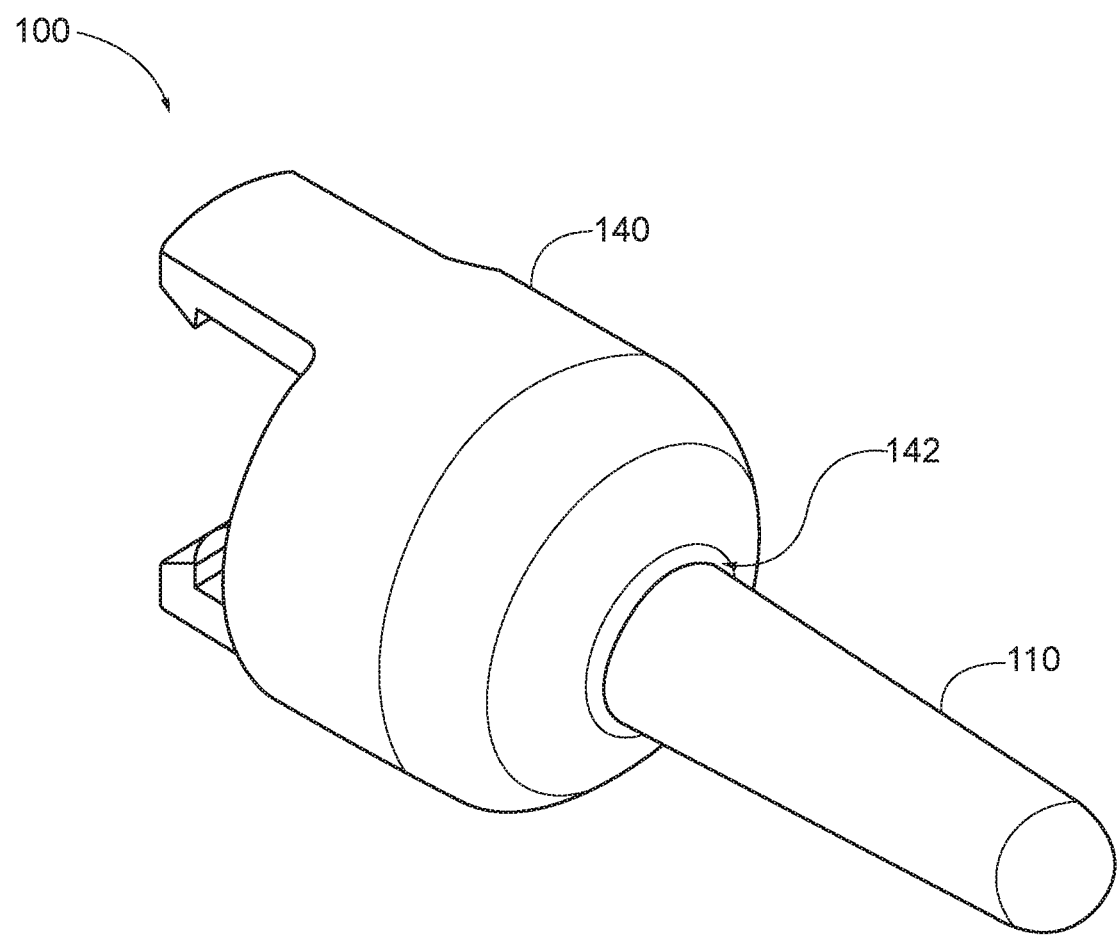
FIG. 3 illustrates a second assembled view of the embodiment of FIG. 1.

The tip assembly 100 includes a housing 140 having an orifice 142. The housing 140 is configured to receive the electrode tip 110, the compression spring 120, and the locking cup 130 into an interior of the housing 140 by accepting the distal end 114 of the electrode tip 110 through the orifice 142 up to the locking sleeve 116. With the electrode tip 110, the compression spring 120, and the locking cup 130 assembled within the interior of the housing 140, the majority of the electrode tip 110 protrudes from the housing 140 out of the orifice 142, as shown in FIG. 2 and FIG. 3. FIG. 2 illustrates a first assembled view of the embodiment of FIG. 1 and FIG. 3 illustrates a second assembled view of the embodiment of FIG. 1.

Figure 4:
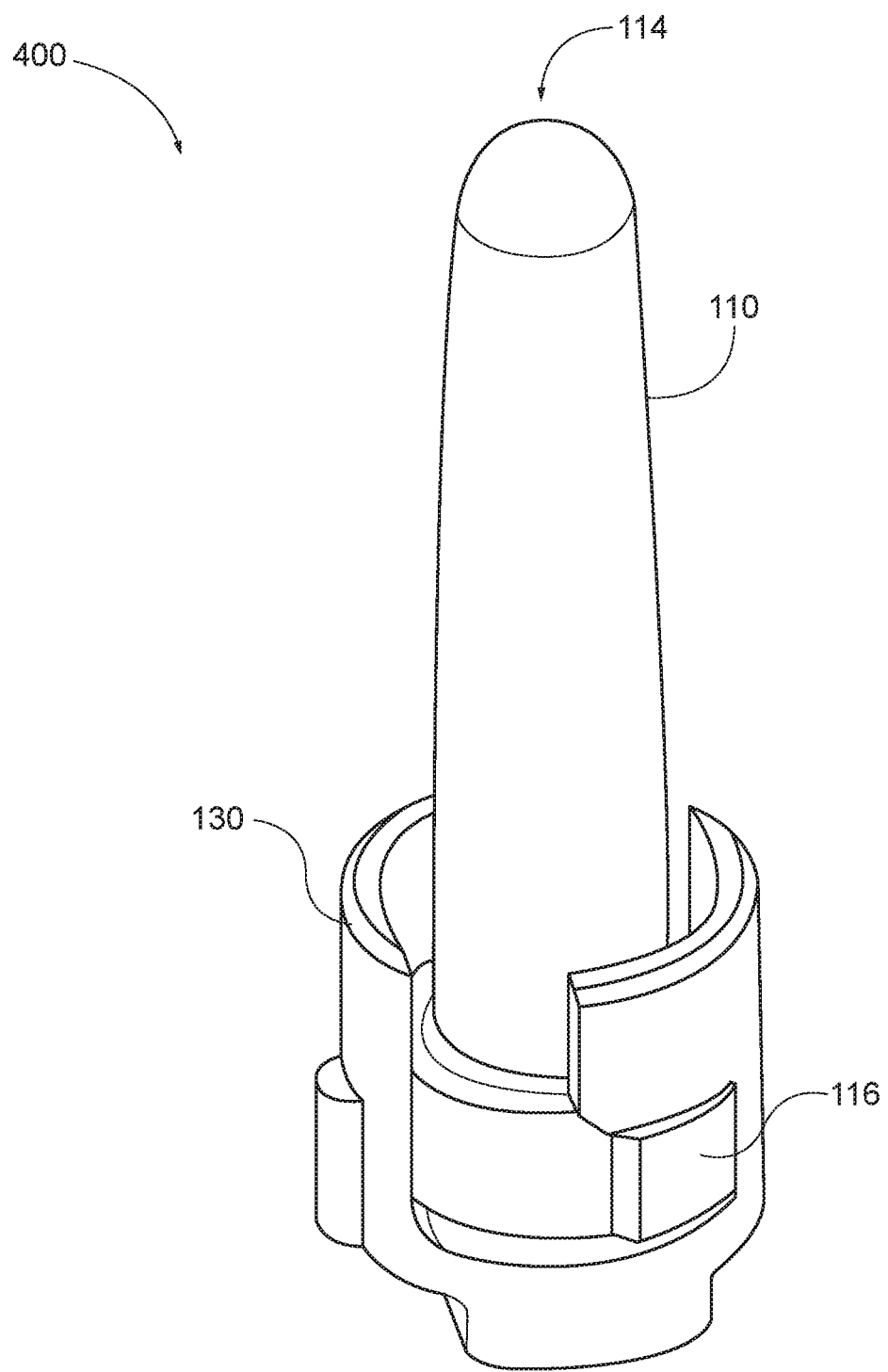
FIG. 4 illustrates a locked configuration of a portion of an assembled embodiment of the spring-loaded tip assembly of FIG. 1 to FIG. 3.
Figure 5:
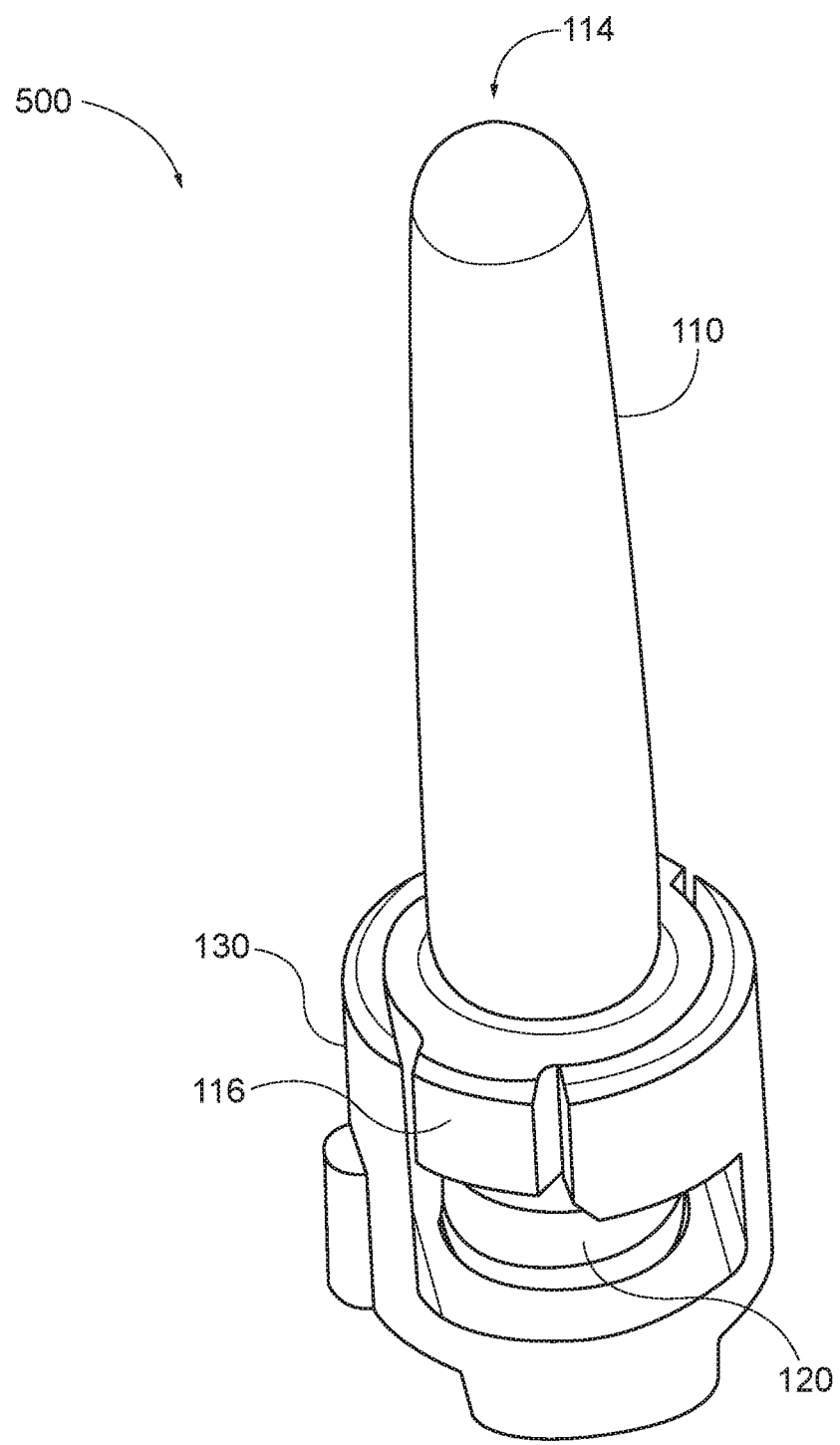
FIG. 5 illustrates an un-locked configuration of a portion of an assembled embodiment of the spring-loaded tip assembly of FIG. 1 to FIG. 3.

In accordance with one embodiment, the locking sleeve 116 and the locking cup 130 are configured to be rotated with respect to each other to allow changing between a locked position and an unlocked position. FIG. 4 illustrates a locked configuration 400 of a portion of an assembled embodiment of the spring-loaded tip assembly 100 of FIG. 1 to FIG. 3, showing the electrode tip 110 and the locking cup 130 in a locked position. FIG. 5 illustrates an un-locked configuration 500 of a portion of an assembled embodiment of the spring-loaded tip assembly 100 of FIG. 1 to FIG. 3, showing the electrode tip 110 and the locking cup 130 in an unlocked position.

In FIG. 4, the compression spring 120 is in the locked position and is not seen in FIG. 4 because it is compressed and entirely encompassed by the locking cup 130 and the locking sleeve 116. In one embodiment, the compression spring 120 is in a fully compressed state in the locked position and the electrode tip 110 is in an immovable state (is locked) with respect to the locking cup 130 and the housing 140. To accomplish the locked position, in one embodiment, a user would push the electrode tip 110 into the housing 140 as far as the electrode tip 110 will go, and then rotate the electrode tip 110 with respect to the locking cup 130. As can be seen in FIG. 4, a portion of the locking sleeve 116 engages with a slot of the locking cup 130 to put the tip assembly 100 in the locked position. Other equivalent locking configurations are possible as well, in accordance with other embodiments. In this manner, the locking position is provided to support a simulated SMAW plate welding operation.

In FIG. 5, the compression spring 120 is in the unlocked position which puts the compression spring 120 in a free state. As can be seen in FIG. 5, the locking sleeve 116 is no longer engaged with the slot of the locking cup 130. The free state allows the compression spring 120 to compress as the distal end 114 of the electrode tip 110 is pushed toward the housing 140 (e.g., as a student welder pushes the distal end 114 of the electrode tip 110 into the joint of a pipe welding coupon during a simulated SMAW pipe welding operation via a mock welding tool having the tip assembly 100 attached thereto). The free state also allows the compression spring 120 to decompress to push the distal end 114 of the electrode tip 110 away from the housing 140 (e.g. as the student welder pulls the mock welding tool, having the tip assembly 100 attached thereto, away from the joint of the pipe welding coupon during the simulated SMAW pipe welding operation). In this manner, a tactile feedback is provided to the student welder to simulate a feel of performing an actual SMAW operation on a pipe as the electrode tip 110 engages the pipe welding coupon during the simulated SMAW operation.

Figure 6:
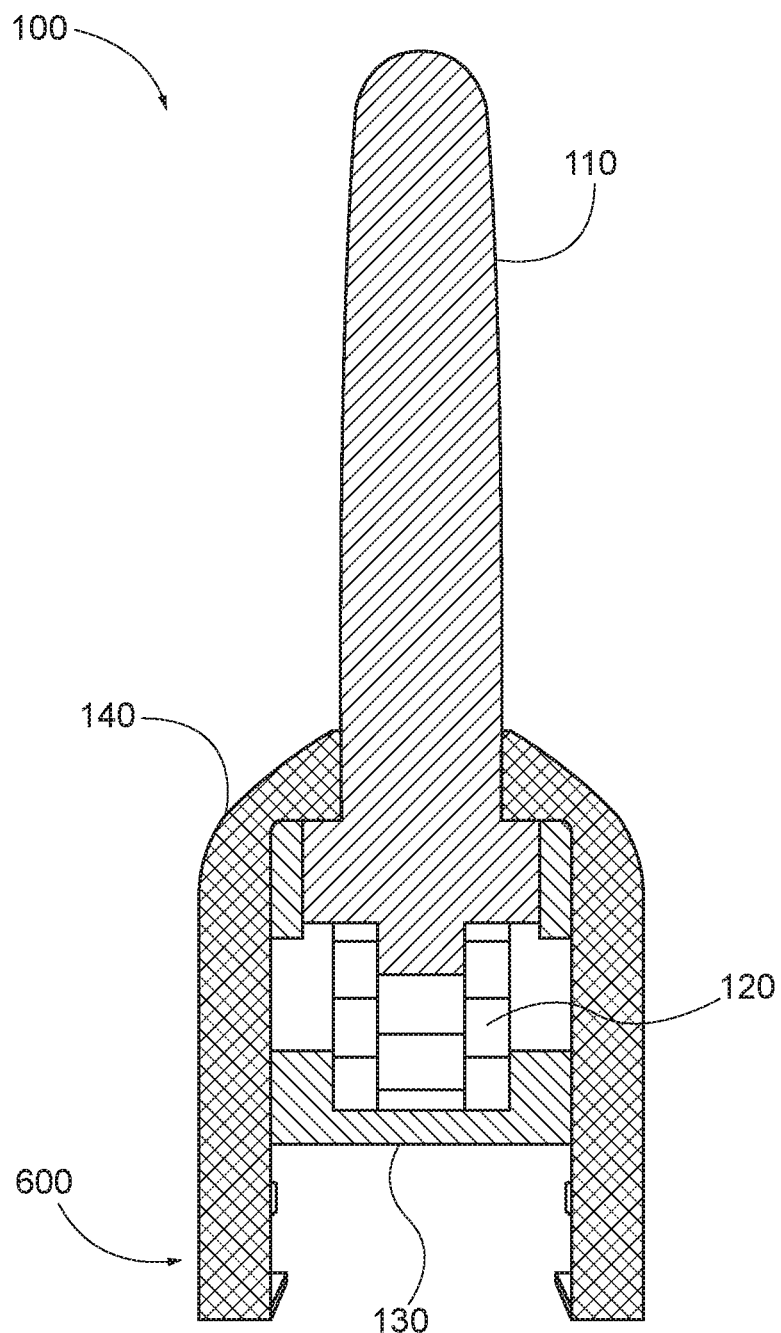
FIG. 6 illustrates a cross-sectional view of the assembled embodiment of the spring-loaded tip assembly of FIG. 1 to FIG. 3.

FIG. 6 illustrates a cross-sectional view of the assembled embodiment of the spring-loaded tip assembly 100 of FIG. 1 to FIG. 3. As seen in FIG. 6, the housing 140 includes an attachable portion 600 which allows the tip assembly 100 to be attached to and removed from a mock welding tool as discussed later herein. The attachable portion 600 of FIG. 6 is in the form of a clip-on or snap-on configuration. Other equivalent attachable portion configurations are possible as well, in accordance with other embodiments.

The electrode tip 110 is made of a material configured to mitigate slippage between the electrode tip 110 and a welding coupon during a simulated SMAW operation. For example, in one embodiment, at least the distal end 114 of the electrode tip 110 is made of a polyoxymethylene material. The polyoxymethylene material mitigates slippage as desired. In accordance with one embodiment, at least a portion of the compression spring 120 is made of a polyetherimide material. The polyetherimide material provides desired compression spring characteristics for applications to simulated SMAW operations. Other equivalent materials may be possible as well, in accordance with other embodiments.

Figure 7:
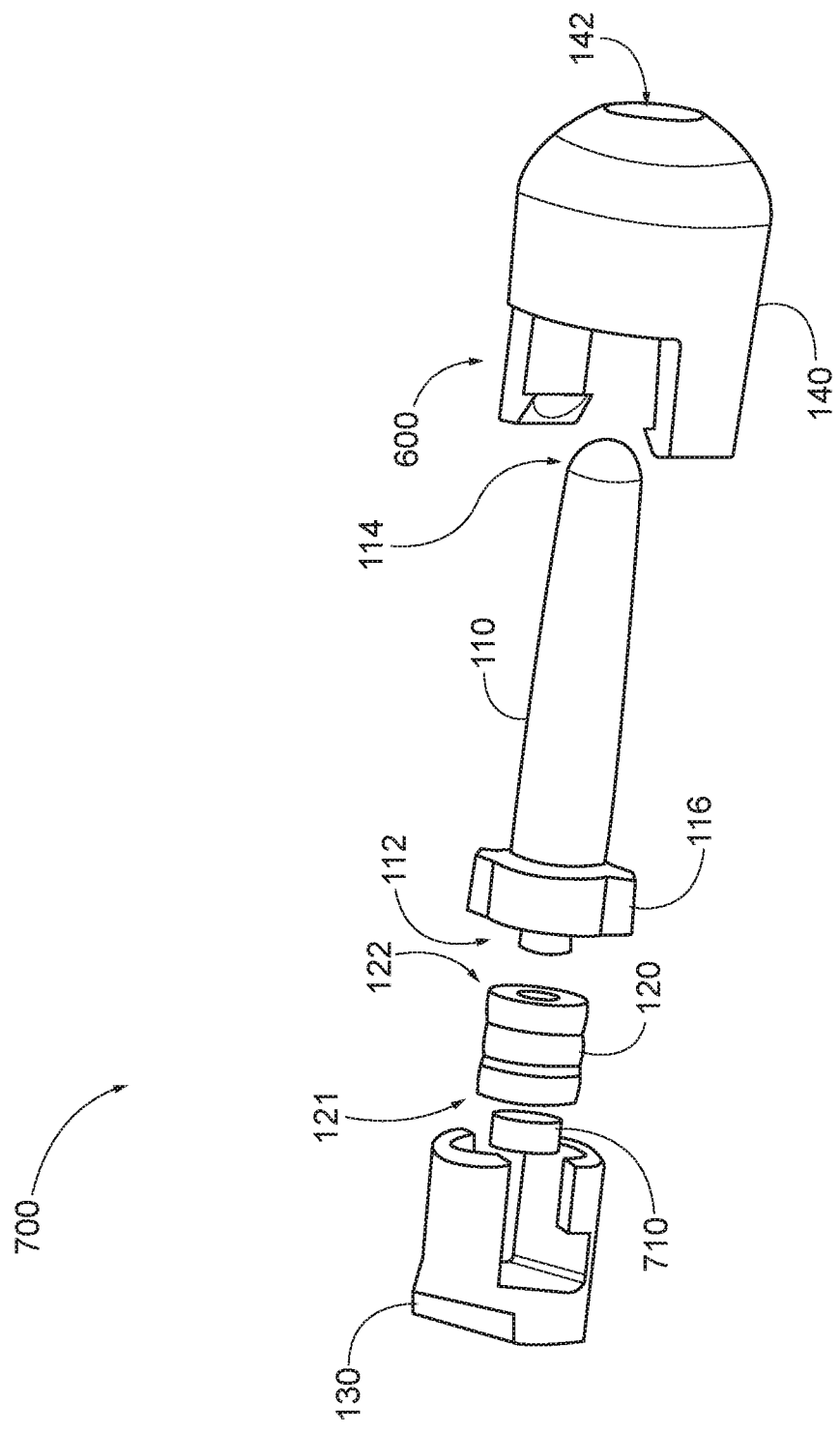
FIG. 7 illustrates an exploded view of a second embodiment of a spring-loaded tip assembly to support a simulated SMAW operation.

FIG. 7 illustrates an exploded view of a second embodiment of a spring-loaded tip assembly 700 to support a simulated SMAW operation. The tip assembly 700 of FIG. 7 is similar to the tip assembly 100 of the previous figures except that the tip assembly 700 further includes a pressure sensor transducer 710. The pressure sensor transducer 710 is configured to interface with the second end 121 of the compression spring 120 to sense an amount of compression of the compression spring 120 and to generate a signal indicating the amount of compression of the compression spring 120. In accordance with one embodiment, the pressure sensor transducer 710 uses piezoelectric technology. In other embodiments, the pressure sensor transducer 710 may use other types of sensor and transducer technology. The cup 130 is configured to encompass the pressure sensor transducer 710, the compression spring 120, and the sleeve 116 of the electrode tip 110. The housing 140 is configured to receive the electrode tip 110, the compression spring 120, the pressure sensor transducer 710, and the cup 130 into an interior of the housing in a similar manner to that of FIG. 1 to FIG. 3.

In one embodiment, the cup 130 and the sleeve 116 of the tip assembly 700 are a locking cup and a locking sleeve similar to that of FIG. 1 to FIG. 3. However, in an alternative embodiment, the cup 130 and the sleeve 116 of the tip assembly 700 do not provide the ability to change between a locked position and an unlocked position as described previously herein. Instead, the electrode tip 110 is always unlocked and in the free state (described previously herein) to support a simulated SMAW pipe welding operation.

The signal generated by the pressure sensor transducer 710 to indicate the amount of compression of the compression spring 120 is representative of at least one simulated arc characteristic, in accordance with one embodiment. The simulated arc characteristic may be an arc voltage, an arc current, an arc length (arc distance), or an extinguished arc. The signal may be provided (wired or wirelessly) to a welding simulator which is configured to correlate the signal to at least one arc characteristic and generate a response based on the correlation as discussed later herein. The signal may be an analog signal and/or a digital signal, in accordance with various embodiments.

Figure 8:
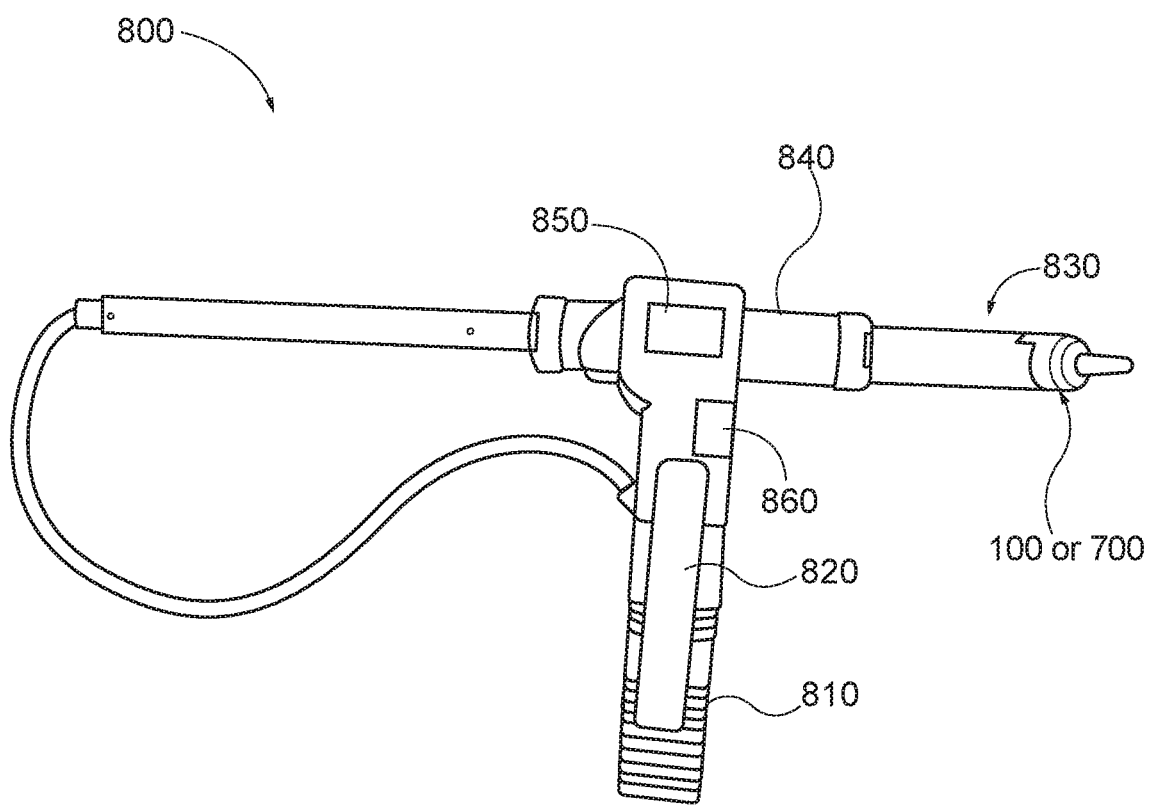
FIG. 8 illustrates a first view of an embodiment of a mock welding tool having the spring-loaded tip assembly of FIG. 1 to FIG. 3.
Figure 9:
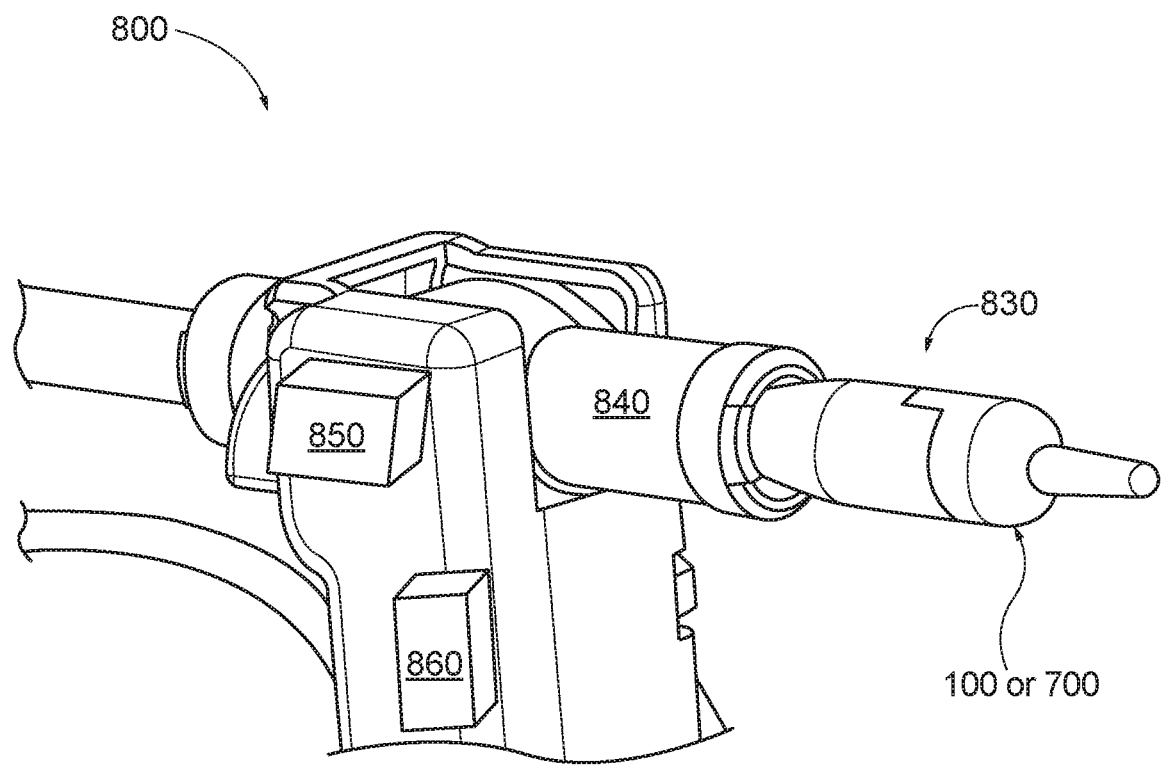
FIG. 9 illustrates a second view of the mock welding tool of FIG. 8.

FIG. 8 illustrates a first view of an embodiment of a mock welding tool 800 having the spring-loaded tip assembly 100 of FIG. 1 or the spring-loaded tip assembly 700 of FIG. 7. FIG. 9 illustrates a second view of a portion of the mock welding tool 800 of FIG. 8. The mock welding tool 800 includes a handle 810 configured to be held by a student welder. The mock welding tool 800 also includes a trigger 820 operatively connected to the handle 810 and configured to indicate an active weld state to a welding simulator. For example, in one embodiment, when a student welder presses the trigger 820, an electrical signal is sent from the mock welding tool 800 to a welding simulator, either wired or wirelessly, to activate a simulated (e.g., virtual reality) welding operation. A welding simulator will be discussed in more detail later herein. The handle 810 and the trigger 820 may be configured for a right-handed student welder in one embodiment, and for a left-handed student welder in another embodiment.

The mock welding tool 800 also includes a mock stick electrode 830 having a spring-loaded tip assembly 100 or 700 attached to a portion thereof. The tip assembly 100 or 700 is as previously described herein, in accordance with various embodiments, and attaches (and is removable) via the attachable portion 600 of the tip assembly 100 or 700 (e.g., also see FIG. 6 and FIG. 7). The attachable portion 600 is configured to clip or snap onto the mock welding tool 800, in accordance with one embodiment. In other embodiments, the attachable portion may be configured to twist onto or slide and lock onto the mock welding tool. Other attachable embodiments are possible as well. Furthermore, in one embodiment, the tip assembly 100 or 700 is configured as an adapter that connects to the mock welding tool 800. The mock welding tool 800 may also support the attachment of other adapter tool configurations for simulation of other types of welding or cutting, for example.

The mock welding tool 800 includes an actuator assembly 840 configured to retract or withdraw the mock stick electrode 830 toward the student welder in response to the student welder activating (e.g., pressing or pulling) the trigger 820. The retracting or withdrawing of the mock stick electrode 830 simulates consumption of a real stick electrode during a SMAW operation. In accordance with one embodiment, the actuator assembly 840 includes an electric motor.

In one embodiment, the mock welding tool 800 includes at least one sensor 850 to aid a welding simulator in tracking the mock welding tool 800 in at least position and orientation in three-dimensional space. The sensor and tracking technology may include one or more of, for example, accelerometers, gyros, magnets, conductive coils, lasers, ultrasonics, radio frequency devices, and scanning systems, in accordance with certain embodiments. An example of a welding simulator with spatial tracking capability is discussed in U.S. Pat. No. 8,915,740 which is incorporated herein by reference in its entirety.

In one embodiment, the mock welding tool 800 includes a communication module 860 configured to communicate with a welding simulator. Communication between the mock welding tool 800 and the welding simulator may take place either wirelessly (e.g., via radio frequency or infrared) or via wired means (e.g., via an electrical cable), in accordance with various embodiments. The communication module 860 may facilitate communication of the electrical signal, produced when the trigger 820 is activated, from the mock welding tool 800 to the welding simulator. The communication module 860 may also facilitate communication of sensor signals produced by the sensor 850 (indicating position and orientation of the mock welding tool 800) from the mock welding tool 800 to the welding simulator. In one embodiment, the communication module 860 may facilitate communication of warning and alert signals from the welding simulator to the mock welding tool 800. For example, the mock welding tool 800 may include light emitting diodes (LEDs) and/or sound-producing transducers to warn and alert a welding student in response to the warning and alert signals.

Figure 10:
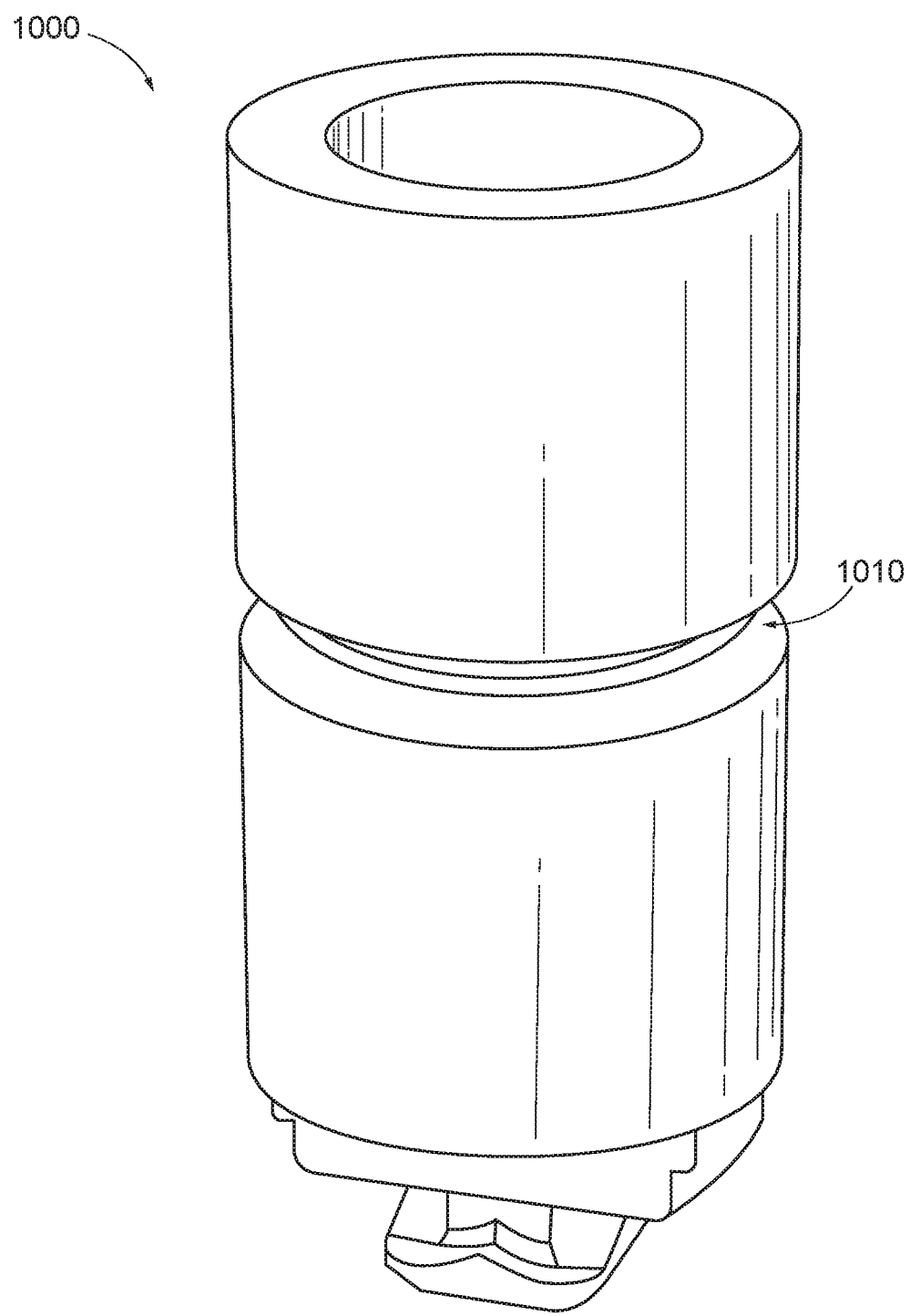
FIG. 10 illustrates an embodiment of a pipe welding coupon used to support a simulated SMAW operation.
Figure 11:
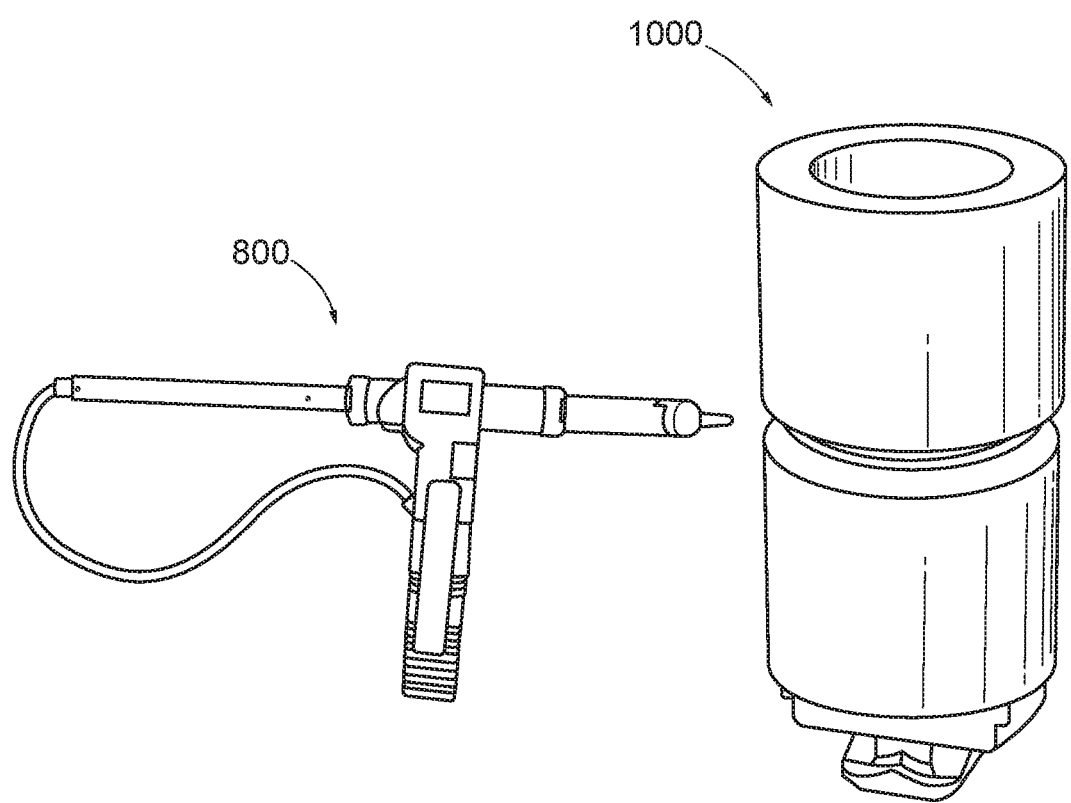
FIG. 11 illustrates one embodiment of the mock welding tool of FIG. 8 and FIG. 9 in relation to the pipe welding coupon of FIG. 10.

FIG. 10 illustrates an embodiment of a pipe welding coupon 1000 used to support a simulated SMAW pipe welding operation. The pipe welding coupon 1000 includes a joint 1010 that circumscribes the coupon 1000. FIG. 11 illustrates one embodiment of the mock welding tool 800 of FIG. 8 and FIG. 9 in relation to the pipe welding coupon 1000 of FIG. 10 to simulate welding of the joint 1010 as part of a simulated SMAW pipe welding operation. The spring-loaded tip assembly of the mock welding tool 800 mitigates slippage at the welding coupon and provides a pressure-based tactile feedback to the student welder.

Figure 12:
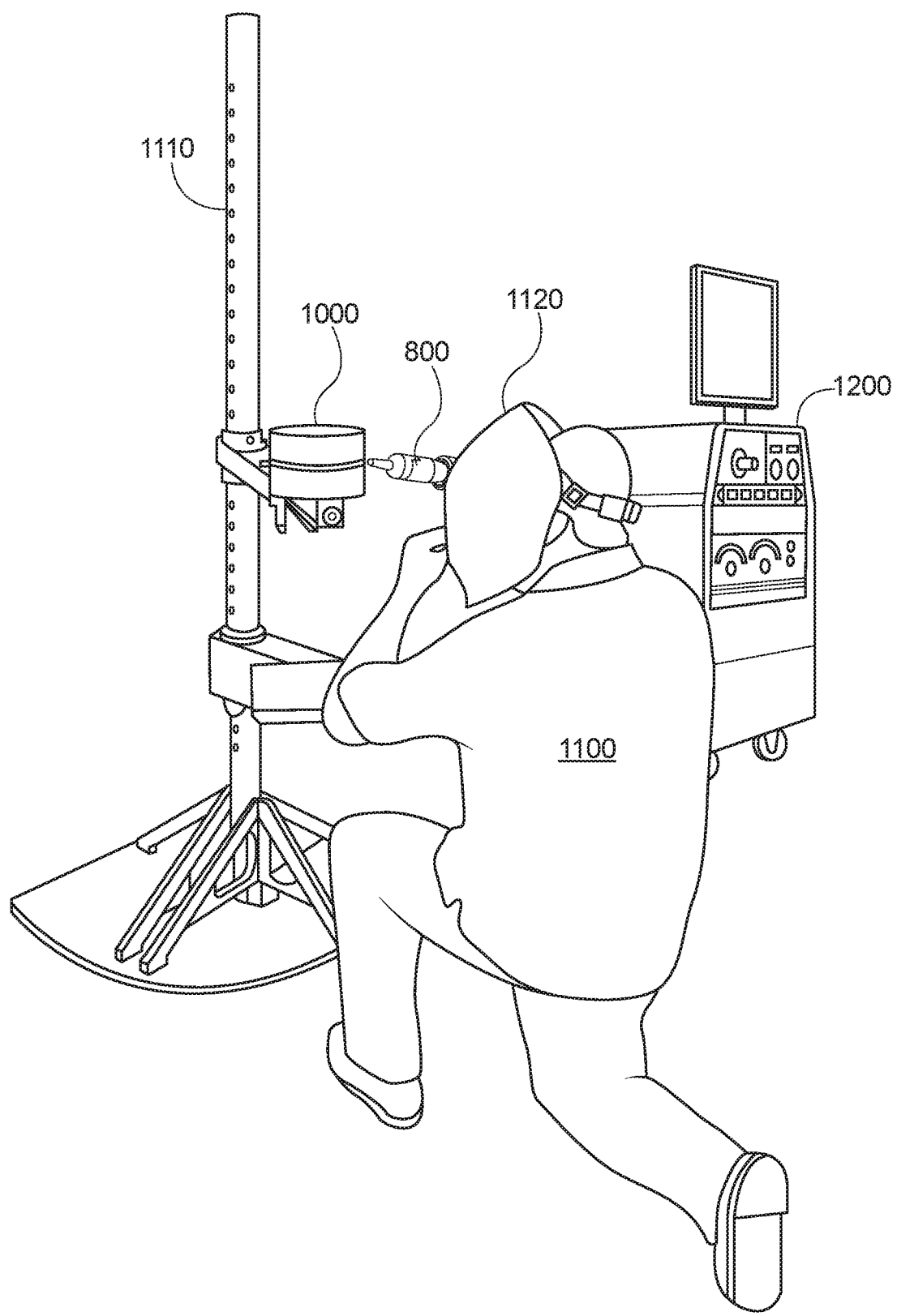
FIG. 12 illustrates an example of a student welder using the mock welding tool of FIG. 8 and FIG. 9 on the pipe welding coupon of FIG. 10 during a simulated SMAW operation as supported by a welding simulator.

FIG. 12 illustrates an example of a student welder 1100 using the mock welding tool 800 of FIG. 8 and FIG. 9 on the pipe welding coupon 1000 of FIG. 10 during a simulated SMAW operation as supported by a welding simulator 1200. As shown in FIG. 12, the pipe welding coupon 1000 is supported by a welding stand 1110 which holds the pipe welding coupon in a desired position for the student welder 1100. In FIG. 12, the student welder 1100 is wearing a virtual reality welding helmet or face mounted display device (FMDD) 1120 which, along with the mock welding tool 800, communicatively interfaces to the welding simulator 1200. In certain embodiments, the welding simulator 1200 provides an augmented reality and/or a virtual reality environment to the student welder which can be viewed by the student welder 1100 on display devices within the FMDD 1120 as the student welder 1100 uses the mock welding tool 800 to practice simulated SMAW pipe welding on the pipe welding coupon 1000. Again, the spring-loaded tip assembly of the mock welding tool 800 provides a pressure-based tactile feedback to the student welder 1100 to simulate a feel of performing an actual shielded metal arc welding operation on a pipe as the electrode tip engages the pipe welding coupon 1000 during a simulated shielded metal arc welding operation.

Figure 13:
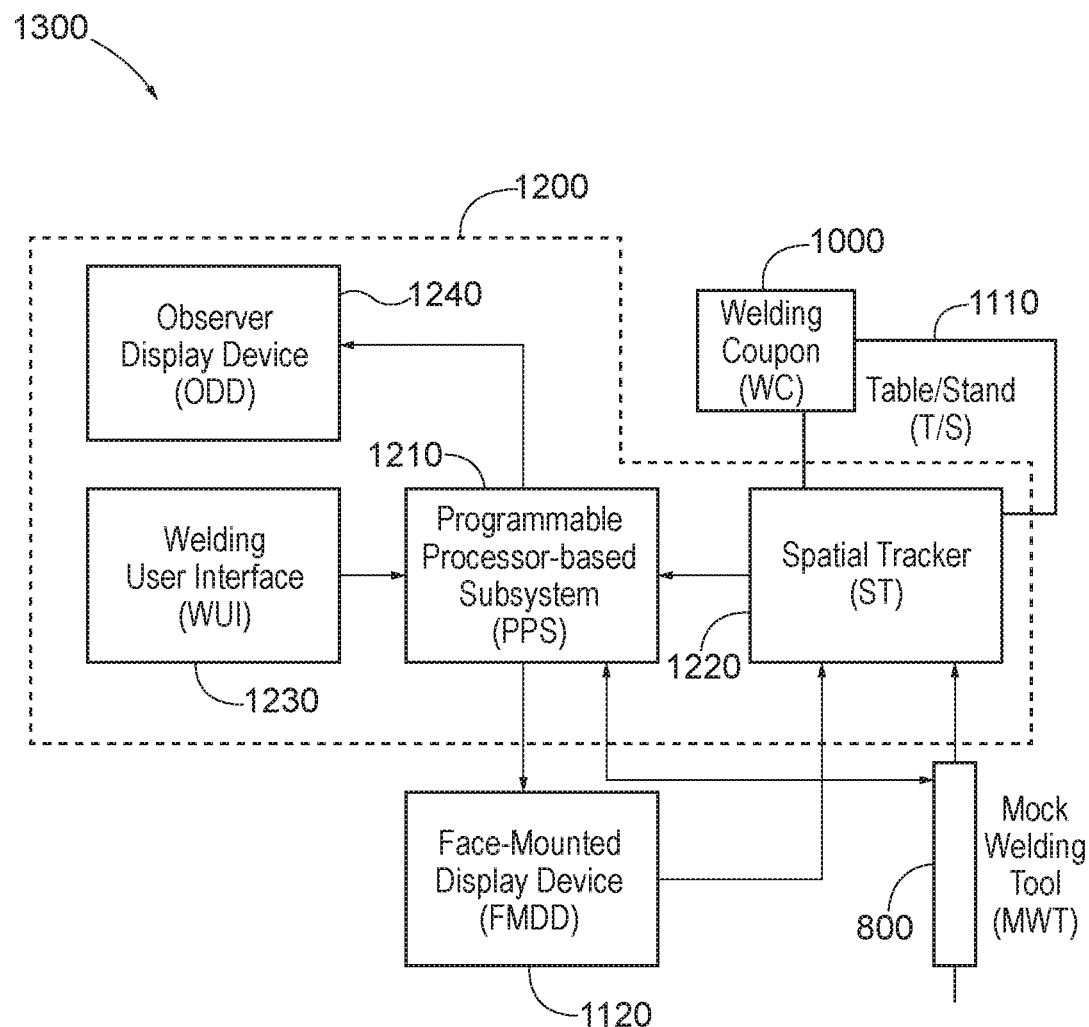
FIG. 13 illustrates a block diagram of an embodiment of a training welding system having the welding simulator of FIG. 12.

FIG. 13 illustrates a block diagram of an embodiment of a training welding system 1300 which includes the welding simulator 1200, the welding coupon 1000, the welding table/stand 1110, the FMDD 1120, and the mock welding tool 800 of FIG. 12. The welding simulator 1200 includes a programmable processor-based subsystem (PPS) 1210, a spatial tracker (ST) 1220, a welding user interface (WUI) 1230, and an observer display device (ODD) 1240. A detailed description of embodiments of the PPS 1210, the ST 1220, the WUI 1230, the ODD 1240 (as well as the FMDD 1120, the welding coupon 1000, and the welding table/stand 1110) can be found in U.S. Pat. No. 8,915,740 which is incorporated herein by reference in its entirety. It is noted that reference numerals that are different from those used herein may be used in U.S. Pat. No. 8,915,740 for the corresponding components.

As discussed previously herein, the signal generated by the pressure sensor transducer 710 to indicate the amount of compression of the compression spring 120 is representative of at least one simulated arc characteristic, in accordance with one embodiment. The simulated arc characteristic may be, for example, an arc voltage, an arc current, an arc length (arc distance), or an extinguished arc. The signal may be provided (wired or wirelessly) to the welding simulator 1200 which is configured to correlate the signal to at least one arc characteristic and generate a response based on the correlation. The signal may be an analog signal and/or a digital signal, in accordance with various embodiments.

For example, the signal may be correlated to an "arc extinguish" characteristic, indicating that the electrode tip 110 has been pushed too far into the joint 1010 of the pipe welding coupon 1000 and that, in the real world, the arc would have been extinguished as a result. As another example, the signal may be correlated to an "arc distance" characteristic, indicating that the arc distance is too short or too long and that the student welder should adjust the position of the mock welding tool 800 with respect to the joint 1010 in an attempt to achieve a proper arc distance. The welding simulator 1200 can provide various alerts and warnings to the student welder based on such arc characteristics, in accordance with one embodiment. Also, the welding simulator 1200 can apply a penalty to a score of a student welder when the student welder goes "out of bounds" with respect to various arc characteristics.

Figure 14:
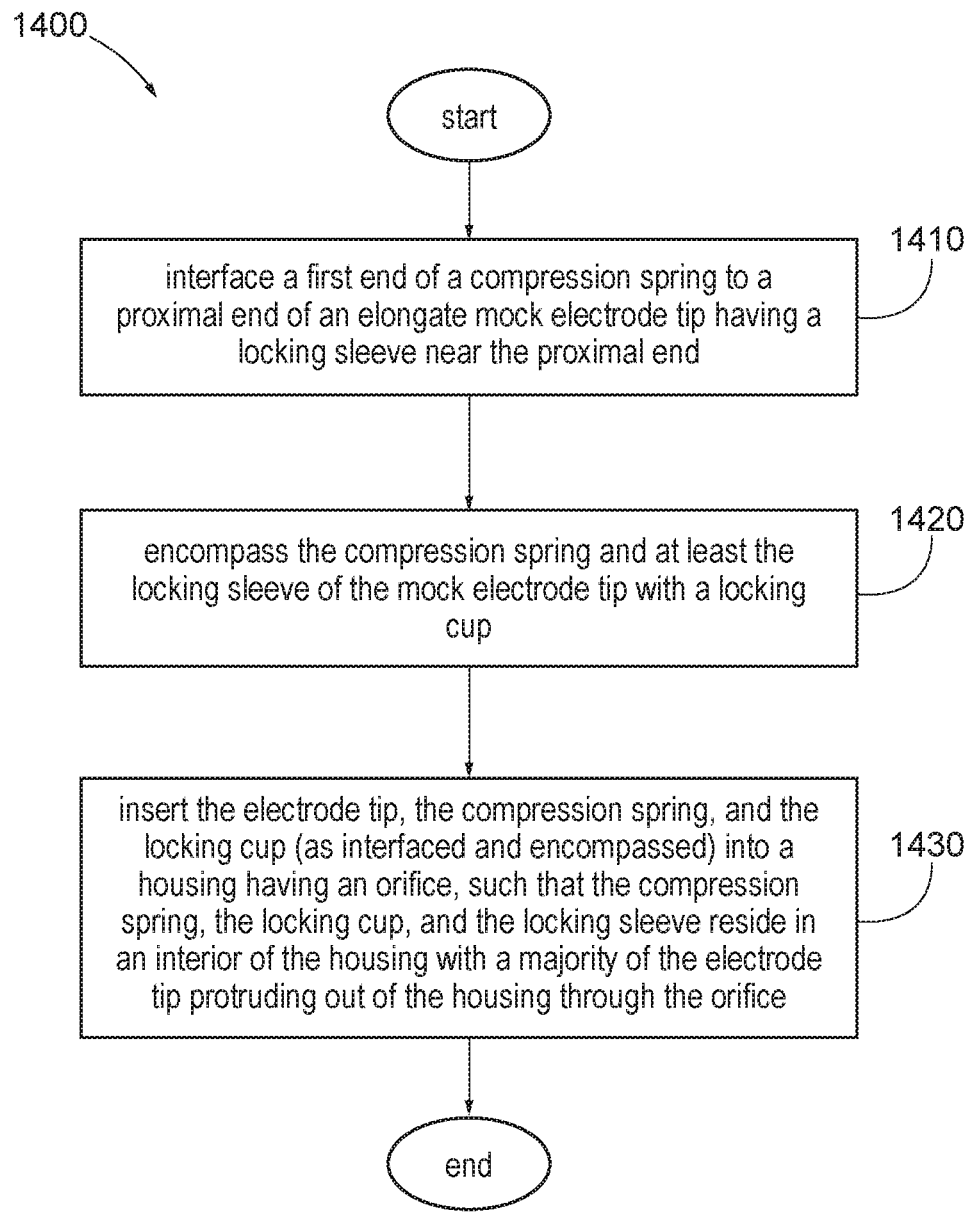
FIG. 14 illustrates a flowchart of a first embodiment of a method to assemble a spring-loaded tip assembly.

FIG. 14 illustrates a flowchart of a first embodiment of a method 1400 to assemble a spring-loaded tip assembly 100. At block 1410 of FIG. 14, interface a first end of a compression spring with a proximal end of an elongate mock electrode tip having a locking sleeve near the proximal end. At block 1420, encompass the compression spring and at least the locking sleeve of the mock electrode tip with a locking cup. At block 1430, insert the electrode tip, the compression spring, and the locking cup (as interfaced and encompassed) into a housing having an orifice such that the compression spring, the locking cup, and the locking sleeve reside in an interior of the housing with a majority of the mock electrode tip protruding out of the housing through the orifice. The blocks 1410-1430 may be performed in the order given or in an alternate order which results in the same final assembled configuration of the spring-loaded tip assembly 100.

Figure 15:
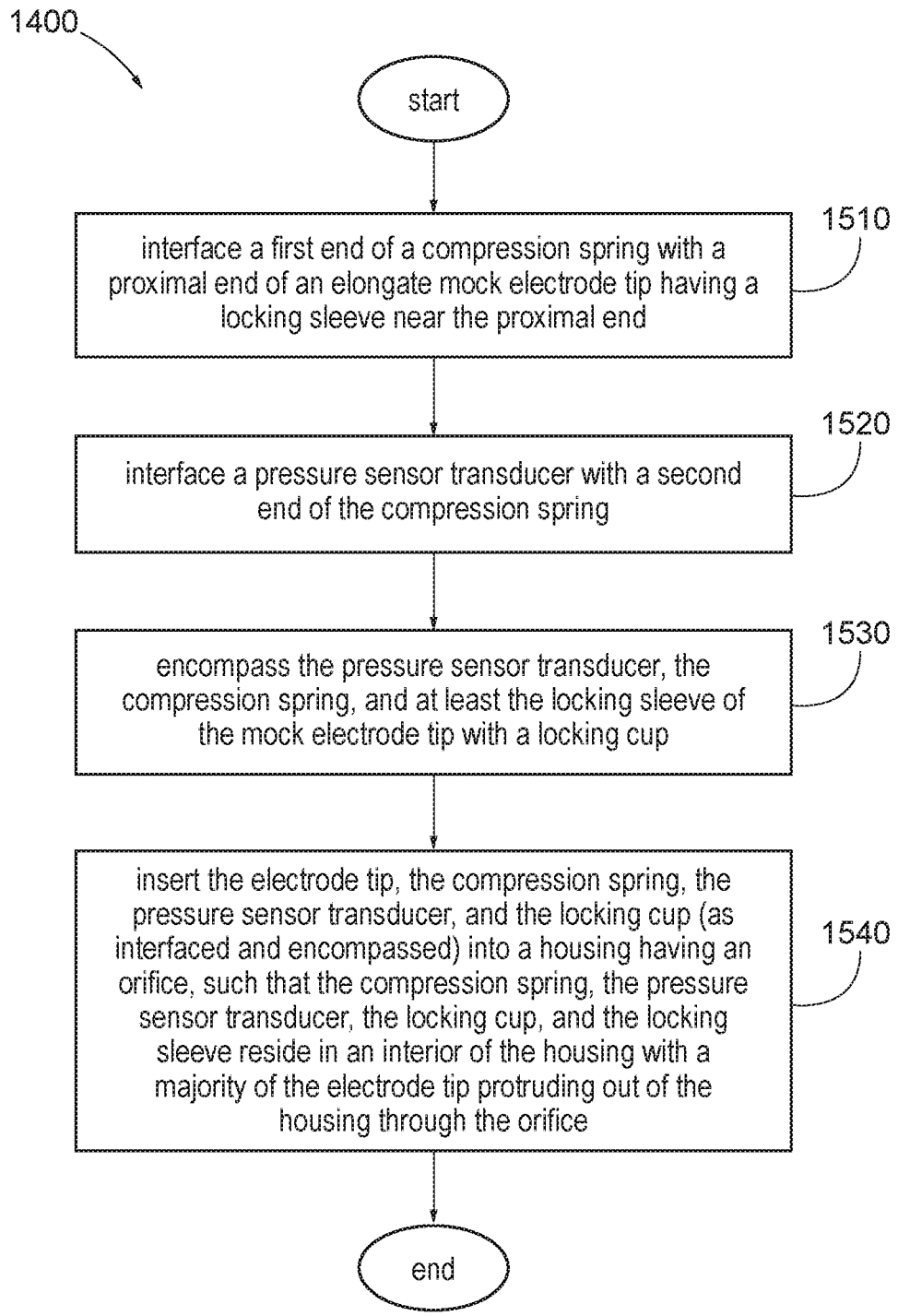
FIG. 15 illustrates a flowchart of a second embodiment of a method to assemble a spring-loaded tip assembly.

FIG. 15 illustrates a flowchart of a second embodiment of a method 1500 to assemble a spring-loaded tip assembly 700. At block 1510, interface a first end of a compression spring with a proximal end of an elongate mock electrode tip having a locking sleeve near the proximal end. At block 1520, interface a pressure sensor transducer with a second end of the compression spring. At block 1530, encompass the pressure sensor transducer, the compression spring, and at least the locking sleeve of the mock electrode tip with a locking cup. At block 1540, insert the electrode tip, the compression spring, the pressure sensor transducer, and the locking cup (as interfaced and encompassed) into a housing having an orifice such the compression spring, the pressure sensor transducer, the locking cup, and the locking sleeve reside in an interior of the housing with a majority of the electrode tip protruding out of the housing through the orifice. The blocks 1510-1540 may be performed in the order given or in an alternate order which results in the same final assembled configuration of the spring-loaded tip assembly 700.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the appended claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof

What is claimed is:

1. A tip assembly to support simulation of a shielded metal arc welding operation, the tip assembly comprising:
   an elongate mock electrode tip having a proximal end, a distal end, and a locking sleeve near the proximal end;
   a compression spring having a first end and a second end, wherein the first end is configured to interface with the proximal end of the electrode tip;
   a locking cup configured to encompass the compression spring and the locking sleeve of the electrode tip; and
   a housing having an orifice, wherein the housing is configured to receive the electrode tip, the compression spring, and the locking cup into the housing by accepting the distal end of the electrode tip through the orifice of the housing up to the locking sleeve, resulting in the compression spring, the locking cup, and the locking sleeve residing in an interior of the housing with a majority of the electrode tip protruding out of the housing, and
   wherein the locking sleeve and the locking cup are configured to be rotated with respect to each other to allow changing between a locked position and an unlocked position.

2. The tip assembly of claim 1, wherein the locked position holds the compression spring in a fully compressed state within the locking cup while holding the electrode tip in an immovable state with respect to the locking cup and the housing, for use in simulated shielded metal arc welding of a plate welding coupon.

3. The tip assembly of claim 1, wherein the unlocked position puts the compression spring in a free state, allowing the compression spring to compress as the distal end of the electrode tip is pushed toward the housing, and allowing the compression spring to decompress to push the distal end of the electrode tip away from the housing, resulting in providing a tactile feedback to a student welder to simulate a feel of performing an actual shielded metal arc welding operation on a pipe as the electrode tip engages a pipe welding coupon during a simulated shielded metal arc welding operation.

4. The tip assembly of claim 1, wherein the housing is configured to removably attach to a mock welding tool for use in a simulated shielded metal arc welding operation.

5. The tip assembly of claim 1, wherein at least the distal end of the electrode tip is made of a material configured to mitigate slippage between the electrode tip and a welding coupon during a simulated shielded metal arc welding operation.

6. The tip assembly of claim 1, wherein at least a portion of the compression spring is made of polyetherimide.

7. The tip assembly of claim 1, wherein at least a portion of the electrode tip is made of polyoxymethylene.

8. A tip assembly to support simulation of a shielded metal arc welding operation, the tip assembly comprising: an elongate mock electrode tip having a proximal end, a distal end, and a sleeve near the proximal end; a compression spring having a first end and a second end, wherein the first end is configured to interface with the proximal end of the electrode tip; a pressure sensor transducer configured to interface with the second end of the compression spring to sense an amount of compression of the compression spring and to generate a signal indicating the amount of compression of the compression spring; a cup configured to encompass the pressure sensor transducer, the compression spring, and the sleeve of the electrode tip; and a housing having an orifice, wherein the housing is configured to receive the electrode tip, the compression spring, the pressure sensor transducer, and the cup into the housing by accepting the distal end of the electrode tip through the orifice of the housing up to the sleeve, resulting in the pressure sensor transducer, the compression spring, the cup, and the sleeve residing in an interior of the housing with a majority of the electrode tip protruding out of the housing, and wherein the sleeve and the cup are configured to be rotated with respect to each other to allow changing between a locked position and an unlocked position.

9. The tip assembly of claim 8, wherein the signal indicating the amount of compression of the compression spring is representative of at least one simulated arc characteristic.

10. The tip assembly of claim 9, wherein the at least one simulated arc characteristic includes at least one of an arc voltage, an arc current, an arc length, and an extinguished arc.

11. The tip assembly of claim 8, wherein the locked position holds the compression spring in a fully compressed state within the cup while holding the electrode tip in an immovable state with respect to the cup and the housing, for use during a simulated shielded metal arc welding operation on a plate welding coupon.

12. The tip assembly of claim 8, wherein the unlocked position puts the compression spring in a free state, allowing the compression spring to compress as the distal end of the electrode tip is pushed toward the housing, and allowing the compression spring to decompress to push the distal end of the electrode tip away from the housing, resulting in providing a tactile feedback to a student welder to simulate a feel of performing an actual shielded metal arc welding operation on a pipe as the electrode tip engages a pipe welding coupon during a simulated shielded metal arc welding operation.

13. A mock welding tool to support simulation of a shielded metal arc welding operation, the mock welding tool comprising:
a handle configured to be held by a student welder;
a trigger operatively connected to the handle and configured to indicate an active weld state to a welding simulator; and
a mock stick electrode having a tip assembly, wherein the tip assembly includes:
an elongate mock electrode tip having a proximal end, a distal end, and a locking sleeve near the proximal end,
a compression spring having a first end and a second end, wherein the first end is configured to interface with the proximal end of the electrode tip,
a locking cup configured encompass the compression spring and the locking sleeve of the electrode tip, and
a housing having an orifice, wherein the housing is configured to receive the electrode tip, the compression spring, and the locking cup into the housing by accepting the distal end of the electrode tip through the orifice of the housing up to the locking sleeve, resulting in the compression spring, the locking cup, and the locking sleeve residing in an interior of the housing with a majority of the electrode tip protruding out of the housing, and
wherein the locking sleeve and the locking cup are configured to be rotated with respect to each other to allow changing between a locked position and an unlocked position.

14. The mock welding tool of claim 13, wherein the locked position holds the compression spring in a fully compressed state within the locking cup while holding the electrode tip in an immovable state with respect to the locking cup and the housing, for use in a simulated shielded metal arc welding operation on a plate welding coupon.

15. The mock welding tool of claim 13, wherein the unlocked position puts the compression spring in a free state, allowing the compression spring to compress as the distal end of the electrode tip is pushed toward the housing, and allowing the compression spring to decompress to push the distal end of the electrode tip away from the housing, resulting in providing a tactile feedback to a student welder to simulate a feel of performing an actual shielded metal arc welding operation on a pipe as the electrode tip engages a pipe welding coupon during a simulated shielded metal arc welding operation.

16. The mock welding tool of claim 13, further comprising at least one sensor to aid the welding simulator in tracking the mock welding tool in at least position and orientation in three-dimensional space.

17. The mock welding tool of claim 13, further comprising an actuator assembly configured to retract the mock stick electrode toward the student welder, in response to the student welder activating the trigger, to simulate consumption of a real stick electrode.

18. The mock welding tool of claim 13, further comprising communication circuitry configured to wirelessly communicate with the welding simulator.

19. The mock welding tool of claim 13, further comprising communication circuitry configured to communicate with the welding simulator via a cable connected between the mock welding tool and the welding simulator.

* * * * *